United States Patent
Jaszewski et al.

(10) Patent No.: US 10,502,312 B1
(45) Date of Patent: Dec. 10, 2019

(54) TRANSMISSION LUBRICANT SYSTEM FOR AN OUTBOARD MOTOR

(71) Applicant: Brunswick Corporation, Lake Forest, IL (US)

(72) Inventors: Wayne M. Jaszewski, Jackson, WI (US); John A. Groeschel, Theresa, WI (US); John A. Tuchscherer, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 462 days.

(21) Appl. No.: 15/339,199

(22) Filed: Oct. 31, 2016

(51) Int. Cl.
| *B63H 20/20* | (2006.01) |
| *F16H 57/04* | (2010.01) |
| *B63H 20/14* | (2006.01) |
| *B63H 20/00* | (2006.01) |
| *B63H 21/14* | (2006.01) |
| *B63H 23/02* | (2006.01) |
| *B63H 23/04* | (2006.01) |
| *B63H 5/10* | (2006.01) |

(52) U.S. Cl.
CPC .......... *F16H 57/045* (2013.01); *B63H 5/10* (2013.01); *B63H 20/002* (2013.01); *B63H 20/14* (2013.01); *B63H 20/20* (2013.01); *B63H 21/14* (2013.01); *B63H 23/02* (2013.01); *B63H 23/04* (2013.01); *F16H 57/043* (2013.01); *F16H 57/0404* (2013.01); *F16H 57/0441* (2013.01); *F16H 57/0493* (2013.01); *B63B 2749/00* (2013.01); *B63B 2758/00* (2013.01)

(58) Field of Classification Search
CPC ........ B63H 5/10; B63H 20/002; B63H 21/14; B63H 20/14; B63H 20/20
See application file for complete search history.

(56) References Cited

U.S. PATENT DOCUMENTS

| 1,619,449 A | 3/1927 | Waters |
| 2,198,397 A | 4/1940 | Szekely |
| 2,289,991 A | 7/1942 | Paxman |
| 2,682,934 A | 7/1954 | Howarth |
| 2,803,974 A | 8/1957 | Kelley |
| 2,854,858 A | 10/1958 | Butterfield |
| 2,867,136 A | 1/1959 | Albinson |
| 2,883,876 A | 4/1959 | Taylor |
| 3,019,671 A | 2/1962 | Albinson |
| 3,025,822 A | 3/1962 | Tenney |
| 3,164,034 A | 1/1965 | Kelley |

(Continued)

OTHER PUBLICATIONS

Unpublished U.S. Appl. No. 14/585,872, filed Dec. 30, 2014.

*Primary Examiner* — S. Joseph Morano
*Assistant Examiner* — Jovon E Hayes
(74) *Attorney, Agent, or Firm* — Andrus Intellectual Property Law, LLP

(57) ABSTRACT

An outboard motor having an internal combustion engine that rotates a driveshaft disposed in a driveshaft housing, a transmission that is operatively connected to the driveshaft and is disposed in a transmission housing located below the driveshaft housing, a set of angle gears that operatively connect the transmission to a propulsor for imparting a propulsive force in a body of water, wherein the set of angle gears are located in a lower gearcase located below the transmission housing, and a lubrication system that circulates lubricant to and from the transmission.

20 Claims, 14 Drawing Sheets

(56) References Cited

U.S. PATENT DOCUMENTS

| | | | |
|---|---|---|---|
| 3,261,591 A | 7/1966 | Campbell | |
| 3,392,603 A | 7/1968 | Sanders | |
| 3,395,893 A | 8/1968 | Kumpf | |
| 3,680,409 A | 8/1972 | Chamberlain | |
| 3,831,401 A | 8/1974 | Hurwitz | |
| 3,977,503 A | 8/1976 | Hurst | |
| 3,994,254 A * | 11/1976 | Woodfill | B63H 11/00 440/1 |
| 4,022,308 A | 5/1977 | Hurst | |
| 4,058,189 A | 11/1977 | Chamberlain | |
| 4,504,238 A * | 3/1985 | Neisen | F01N 13/004 123/41.08 |
| 4,820,209 A * | 4/1989 | Newman | B63H 23/30 192/221 |
| 4,850,911 A * | 7/1989 | Nakahama | B63H 20/22 440/86 |
| 4,919,009 A | 4/1990 | Newman | |
| 5,018,996 A * | 5/1991 | Newman | B63H 20/20 440/75 |
| 5,154,654 A | 10/1992 | Yamazaki | |
| 5,190,488 A | 3/1993 | Fujimoto | |
| 5,564,992 A | 10/1996 | Cunningham | |
| 6,053,834 A | 4/2000 | Savoyard | |
| 6,062,926 A | 5/2000 | Alexander, Jr. et al. | |
| 6,146,223 A | 11/2000 | Karls et al. | |
| 6,346,017 B1 * | 2/2002 | Silorey | B63H 5/125 440/112 |
| 6,497,594 B1 | 12/2002 | Towner | |
| 6,755,703 B1 | 6/2004 | Erickson | |
| 7,010,911 B2 | 3/2006 | Morise | |
| 7,131,386 B1 | 11/2006 | Caldwell | |
| 7,387,556 B1 | 6/2008 | Davis | |
| 7,458,866 B2 | 12/2008 | Nakamura | |
| 7,485,020 B2 | 2/2009 | Nakamura | |
| 7,544,110 B1 | 6/2009 | Phillips et al. | |
| 7,632,161 B1 | 12/2009 | Waldvogel et al. | |
| 7,997,398 B1 | 8/2011 | Phillips et al. | |
| 8,298,025 B2 | 10/2012 | Eichinger | |
| 8,460,041 B2 * | 6/2013 | Davis | B63H 20/14 440/75 |
| 9,441,724 B1 | 9/2016 | Pugh | |
| 9,676,463 B1 | 6/2017 | Fortl | |
| 9,759,321 B1 | 9/2017 | Fortl | |
| 9,840,316 B1 * | 12/2017 | Jaszewski | B63H 20/20 |
| 9,896,172 B1 * | 2/2018 | Pugh | B63H 20/002 |
| 9,919,783 B1 * | 3/2018 | Tuchscherer | B63H 20/20 |
| 9,964,210 B1 * | 5/2018 | Jaszewski | F16H 63/3003 |
| 2004/0035232 A1 | 2/2004 | Plews | |
| 2006/0016034 A1 | 6/2006 | Nakamura | |
| 2006/0116034 A1 | 6/2006 | Nakamura | |
| 2008/0096713 A1 | 4/2008 | Beson | |
| 2013/0267133 A1 | 10/2013 | Davis et al. | |
| 2013/0267134 A1 | 10/2013 | Davis et al. | |
| 2013/0273792 A1 * | 10/2013 | Davis | B63H 20/14 440/75 |
| 2014/0038478 A1 | 2/2014 | Foreman | |
| 2014/0259896 A1 | 9/2014 | Davis | |
| 2015/0013486 A1 * | 1/2015 | Kubo | B63H 20/14 74/339 |
| 2015/0017847 A1 | 1/2015 | Kubo | |
| 2015/0367924 A1 | 12/2015 | Davis | |
| 2017/0259896 A1 | 9/2017 | Davis | |

* cited by examiner

TRANSMISSION LUBRICANT SYSTEM FOR AN OUTBOARD MOTOR

FIELD

The present disclosure generally relates to outboard motors, and more particularly to lubrication systems for lubricating a transmission in an outboard motor.

BACKGROUND

The Background and Summary are provided to introduce a selection of concepts that are further described below in the Detailed Description. The Background and Summary are not intended to identify key or essential features of the claimed subject matter, nor are they intended to be used as an aid in limiting the scope of the claimed subject matter.

The following U.S. Patents are incorporated herein by reference:

U.S. Pat. No. 3,994,254 discloses a multiple-speed transmission for coupling an engine to the impeller of a marine jet drive, such that an overdrive connection powers the jet drive under operating conditions up to a predetermined upper limit of cruising speeds and such that a reduced drive, for example a direct-drive connection, is automatically established for jet-drive speeds in excess of the cruising conditions.

U.S. Pat. No. 4,504,238 discloses a fluid cooler for hydraulic or other fluids in a marine drive that is provided in the exhaust pipe of a marine drive so that cooling water in the exhaust pipe may remove heat from fluid in the cooler.

U.S. Pat. No. 4,820,209 discloses a fluid coupling in a marine drive between the engine and the propulsion unit. The fluid coupling includes a fluid pump adapted to be driven by the crankshaft of the engine, and a turbine adapted to be driven by the fluid pump. A series of reactor vanes is provided in the fluid coupling. The reactor vanes are adapted to be driven in a direction opposite the direction of rotation of the fluid pump. The turbine and the reactor vanes are connected to shafts which extend from the fluid coupling to a transmission housing. Each shaft is provided with a gear and a brake disc. An output shaft extends from the transmission housing, and includes a pair of freely rotatable gears engageable with the gears on the reactor shaft and the turbine shaft.

U.S. Pat. No. 5,018,996 discloses a fluid coupling transmission adapted for interposition between the engine and the propulsion unit of a marine drive. The fluid coupling transmission provides variable speed operation in both forward and reverse. A fluid pump is drivingly connected to the engine crankshaft, and is adapted to drive a turbine. A series of variable position vanes are disposed between the fluid pump and turbine at the entrance of fluid into the pump, for controlling the power transfer therebetween by controlling the amount of fluid passing through the pump and acting on the turbine. A ring gear is connected to the turbine, and a sun gear is connected to the output shaft of the transmission. One or more planet gears are provided between the ring gear and the sun gear, and are rotatably mounted to a carrier member, which extends coaxially with respect to the output shaft. An output control mechanism, including a brake band and a plate clutch mechanism, is selectively engageable with the carrier member so as to control the direction of rotation of the transmission output shaft.

U.S. Pat. No. 6,062,926 discloses a hydraulic system for a marine propulsion unit. A vertical drive shaft is operably connected to the engine of the propulsion unit and carries a pinion that drives a pair of coaxial bevel gears. An inner propeller shaft and an outer propeller shaft are mounted concentrically in the lower torpedo section of the gear case and each propeller shaft carries a propeller. To provide forward movement for the watercraft, a sliding clutch is moved in one direction to operably connect the first of the bevel gears with the inner propeller shaft to drive the rear propeller. A hydraulically operated multi-disc clutch is actuated when engine speed reaches a pre-selected elevated value to operably connect the second of the bevel gears to the outer propeller shaft, to thereby drive the second propeller in the opposite direction.

U.S. Pat. No. 6,146,223 discloses a marine propulsion device having a water inlet system that comprises at least a plurality of frontal inlet openings at the tapered forward end of a gearcase portion of a housing structure. The water inlet system can be provided for an outboard motor or a stern drive unit. Additional water flow can be provided through side inlet formed in the housing structure of the marine propulsion device where both the frontal inlet openings and side inlet openings are connected with fluid communication with the water pump mounted within the housing structure.

U.S. Pat. No. 6,755,703 discloses a hydraulic assist mechanism for use in conjunction with a gear shift device that provides a hydraulic cylinder and piston combination connected by a linkage to a gear shift mechanism. Hydraulic pressure can be provided by a pump used in association with either a power trim system or a power steering system. Hydraulic valves are used to pressurize selected regions of the hydraulic cylinder in order to actuate a piston which is connected, by an actuator, to the gear shift mechanism.

U.S. Pat. No. 7,131,386 discloses a hydraulic system for a marine vessel that incorporates a single hydraulic pump that can be driven by either first or second motive devices, such as an internal combustion engine or an electric motor. Depending on the circumstances, the pressure required by the hydraulic system is provided by the pump when it is driven by either the first or second motive devices. As a result, only two motive devices can provide the necessary driving capacity for the hydraulic pump under all operating circumstances, including those when the engine is not running.

U.S. Pat. No. 7,387,556 discloses an exhaust system for a marine propulsion device that directs a flow of exhaust gas from an engine located within the marine vessel, and preferably within a bilge portion of the marine vessel, through a housing which is rotatable and supported below the marine vessel. The exhaust passageway extends through an interface between stationary and rotatable portions of the marine propulsion device, through a cavity formed in the housing, and outwardly through hubs of pusher propellers to conduct the exhaust gas away from the propellers without causing a deleterious condition referred to as ventilation.

U.S. Pat. No. 7,544,110 discloses an actuator for a marine transmission that uses four cavities of preselected size in order to provide four potential forces resulting from pressurized hydraulic fluid within those cavities. The effective areas of surfaces acted upon by the hydraulic pressure are selected in order to provide increased force to move the actuator toward a neutral position from either a forward or reverse gear position. Also, the relative magnitudes of these effective areas are also selected to provide a quicker movement into gear than out of gear, given a similar differential magnitude of pressures within the cavities.

U.S. Pat. No. 7,632,161 discloses a hydraulic valve, such as a rotary valve, connected in fluid communication with a hydraulic actuator that, in turn, causes a clutch to move between forward, neutral, and reverse gear positions. A marine transmission is caused to shift between these gear positions in response to movement of a spool of the hydraulic valve, which can be a rotary valve. Movement of the valve causes an actuator to move to the selected gear position and maintain that gear position until a subsequent movement of the hydraulic valve.

U.S. Pat. No. 7,997,398 discloses a marine transmission providing a cylindrical spool valve that is disposed within the gear case of the transmission and has a movable portion that is axially movable in a vertical direction to select forward, neutral, and reverse gear positions of the transmission. A piston assembly provides a primary piston and two auxiliary pistons which cooperate with each other to provide appropriate hydraulic forces which move a dog clutch into engagement with forward or reverse gears or toward a location in non-engagement with neither the forward nor reverse gears. The spool valve is generally cylindrical and disposed within a narrow column portion of the gear case of a marine propulsion system.

U.S. Pat. No. 8,298,025 discloses cooling systems and methods for hybrid marine propulsion systems. A first cooling circuit is arranged to convey raw cooling water through an internal combustion engine and to at least one drive component of a drive unit for the marine propulsion system. A second control circuit is arranged to convey raw cooling water through an electric motor. The system is arranged such that raw cooling water in the second cooling circuit is conveyed to the first cooling circuit to cool the drive component without cooling the component of the internal combustion engine.

U.S. Pat. No. 9,441,724 discloses a method of monitoring and controlling a transmission in a marine propulsion device that comprises the steps of receiving a rotational input speed of an input shaft to the transmission, receiving a rotational output speed of an output shaft from the transmission, receiving a shift actuator position value, and receiving an engine torque value. The method further comprises calculating a speed differential based on the input speed and the output speed, and generating a slip profile based on a range of speed differentials, engine torque values, and shift actuator position values.

U.S. patent application Ser. No. 14/585,872 discloses a transmission for a marine propulsion device having an internal combustion engine that drives a propulsor for propelling a marine vessel in water. An input shaft is driven into rotation by the engine. An output shaft drives the propulsor into rotation. A forward planetary gearset that connects the input shaft to the output shaft so as to drive the output shaft into forward rotation. A reverse planetary gearset that connects the input shaft to the output shaft so as to drive the output shaft into reverse rotation. A forward brake engages the forward planetary gearset in a forward gear wherein the forward planetary gearset drives the output shaft into the forward rotation. A reverse brake engages the reverse planetary gearset in a reverse gear wherein the reverse planetary gearset drives the output shaft into the reverse rotation.

SUMMARY

The present disclosure generally relates to an outboard motor having an internal combustion engine and a driveshaft that is rotated by the internal combustion engine, the driveshaft being disposed in a driveshaft housing. A transmission is operatively connected to the driveshaft, wherein the transmission is disposed in a transmission housing located below the driveshaft housing. A set of angle gears are located in a lower gearcase located below the transmission housing. The set of angle gears operatively connect the transmission to a propulsor for imparting a propulsive force in a body of water. A lubrication system circulates lubricant to and from the transmission.

Various other features, objects and advantages of the disclosure will be made apparent from the following description taken together with the drawings.

BRIEF DESCRIPTION OF THE DRAWINGS

The drawings illustrate the best mode presently contemplated of carrying out the concepts of the present disclosure. The same numbers are used throughout the drawings to reference like features and like components. In the drawings.

DETAILED DISCLOSURE

This written description uses examples to disclose embodiments of a marine propulsion device, including the best mode, and also to enable any person skilled in the art to make and use the same. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Figure 1:
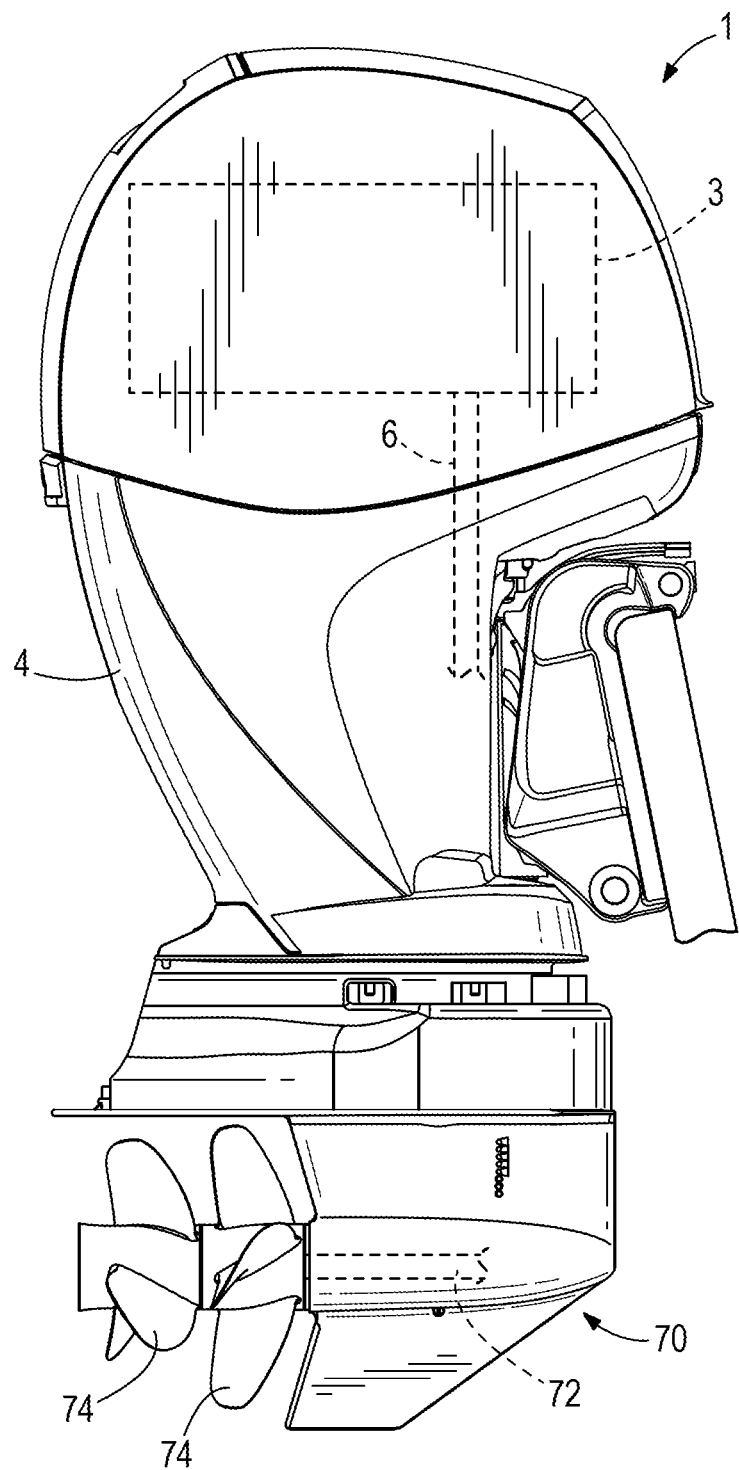
FIG. 1 is a side view of the starboard side of a propulsion device according to the present disclosure.

FIG. 1 shows the starboard side of a propulsion device 1. The propulsion device 1 includes an internal combustion engine 3 that rotates a driveshaft 6 within a driveshaft housing 4. The driveshaft 6 causes rotation of a propulsor shaft 72, which imparts a propulsive force on a body of water via a propulsor 74, which in this example includes counter-rotating propellers.

It should be noted that the present disclosure generally uses the terms outboard motor and propulsive device synonymously. Moreover, the present disclosure also applies in the context of inboard motors, stern drives, jet drives, pod drives, and any other device capable of propelling a vessel in water.

Figure 2:
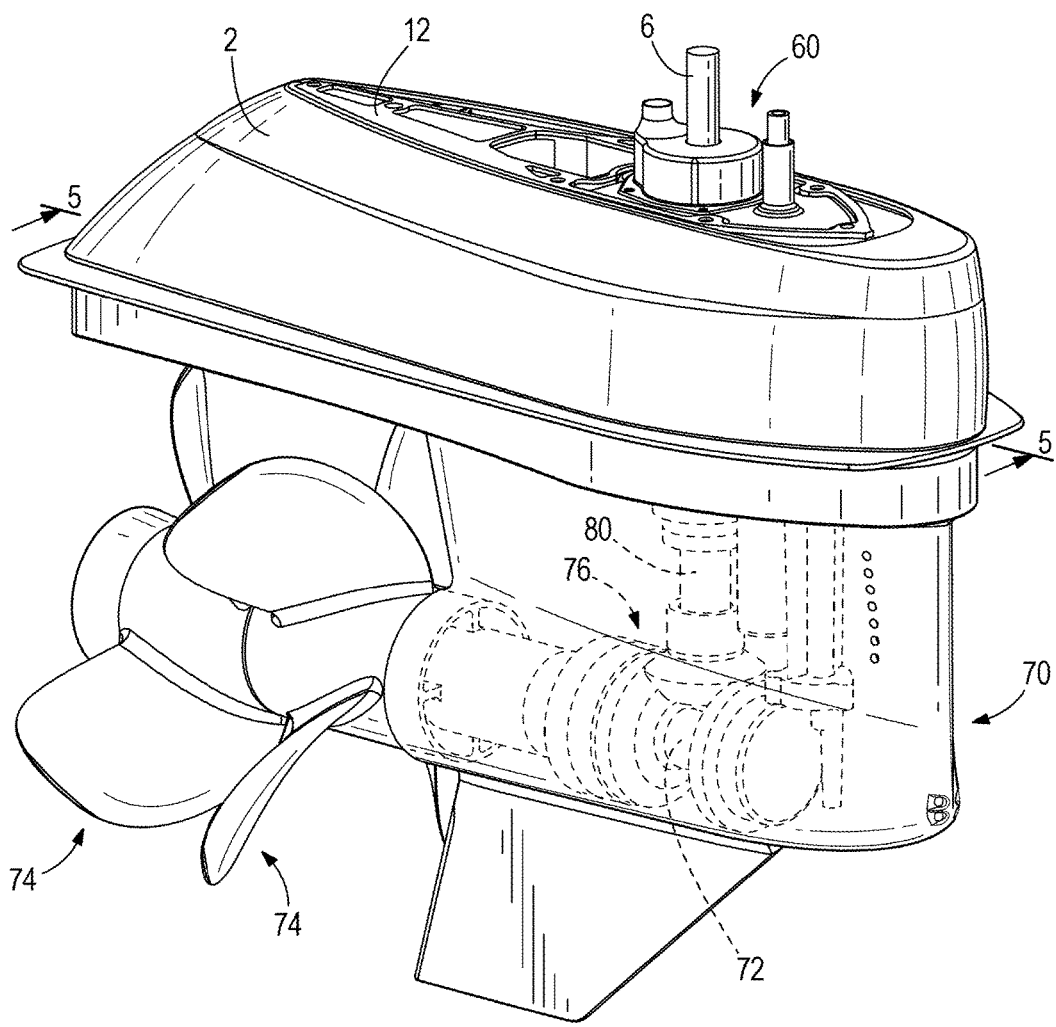
FIG. 2 is an isometric view of the forward starboard side of a lower portion of the propulsion device.

FIG. 2 shows the forward starboard side of a lower portion of the propulsion device 1. In practice, the lower portion of the propulsion device 1 would be operatively connected to the internal combustion engine 3 to generate a propulsive force from the internal combustion engine 3. In particular, FIG. 2 shows a lower gearcase 70 that covers and contains a propulsor shaft 72 that is rotatably engaged with the propulsor 74. The propulsor shaft 72 is operatively connected through a set of angle gears 76 to a transmission output shaft 80, which is operatively connected to a transmission (shown as 90 in FIG. 4). The transmission 90 and a transmission housing 10 that contains the transmission 90 are largely covered in FIG. 2 by an upper cowling 2, which provides optional aesthetic improvement, or a reduced cost, over a transmission housing with a finished appearance.

Figure 3:
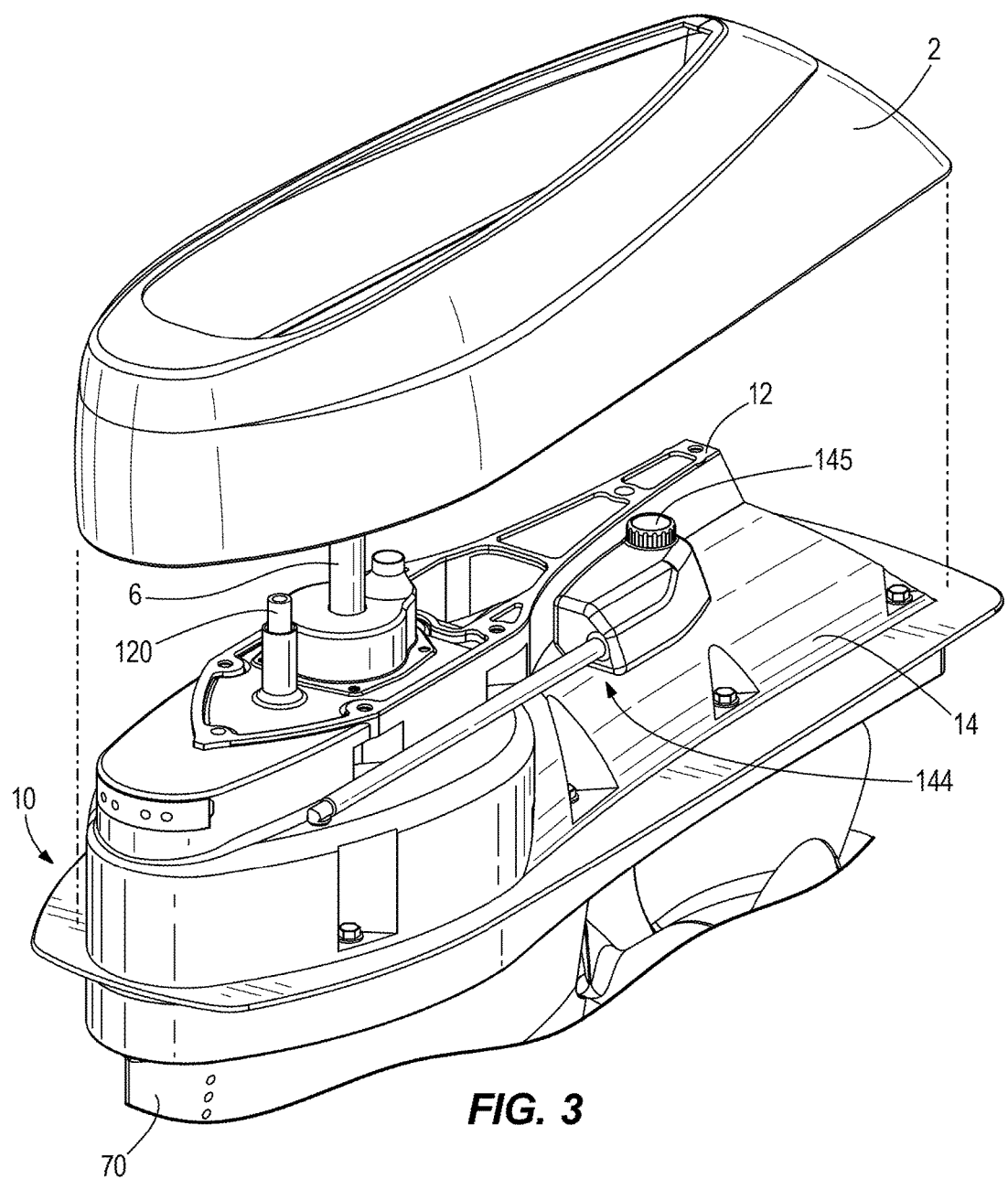
FIG. 3 is an isometric view of the upper forward port side of the propulsion device, wherein the upper cowling has been partially removed.

While the transmission housing 10 is best seen in FIG. 3, FIG. 2 shows an upper flange 12 of the transmission housing 10 that allows the transmission housing 10 to be removeably coupled to a driveshaft housing 4 positioned above (as shown in FIG. 1). The driveshaft housing 4 contains driveshaft 6 rotated by the internal combustion engine 3 as known in the art. A lower portion of the driveshaft 6 is shown in FIG. 2.

FIG. 3 shows the propulsion device 1 from the forward port side with the upper cowling 2 removed to reveal the transmission housing 10. The transmission housing 10 has a lower flange 14 to removeably couple the transmission housing 10 to the lower gearcase 70. In the embodiment shown, the lower flange 14 of the transmission housing 10 is coupled to the lower gearcase 70 using multiple bolts inserted downwardly from above. Likewise, FIG. 3 depicts the upper flange 12 of the transmission housing 10 being removeably coupleable to the driveshaft housing 4 by inserting bolts upwardly from below the upper flange 12.

It will be understood by one having ordinary skill in the art that other mechanisms for coupling the transmission housing 10 to the driveshaft housing and coupling the lower gearcase 70 to the transmission housing 10 could be used.

FIG. 3 further shows the lower portion of the driveshaft 6, as well as a shifter 120 that controls the transmission 90, as will be discussed below.

Figure 4:
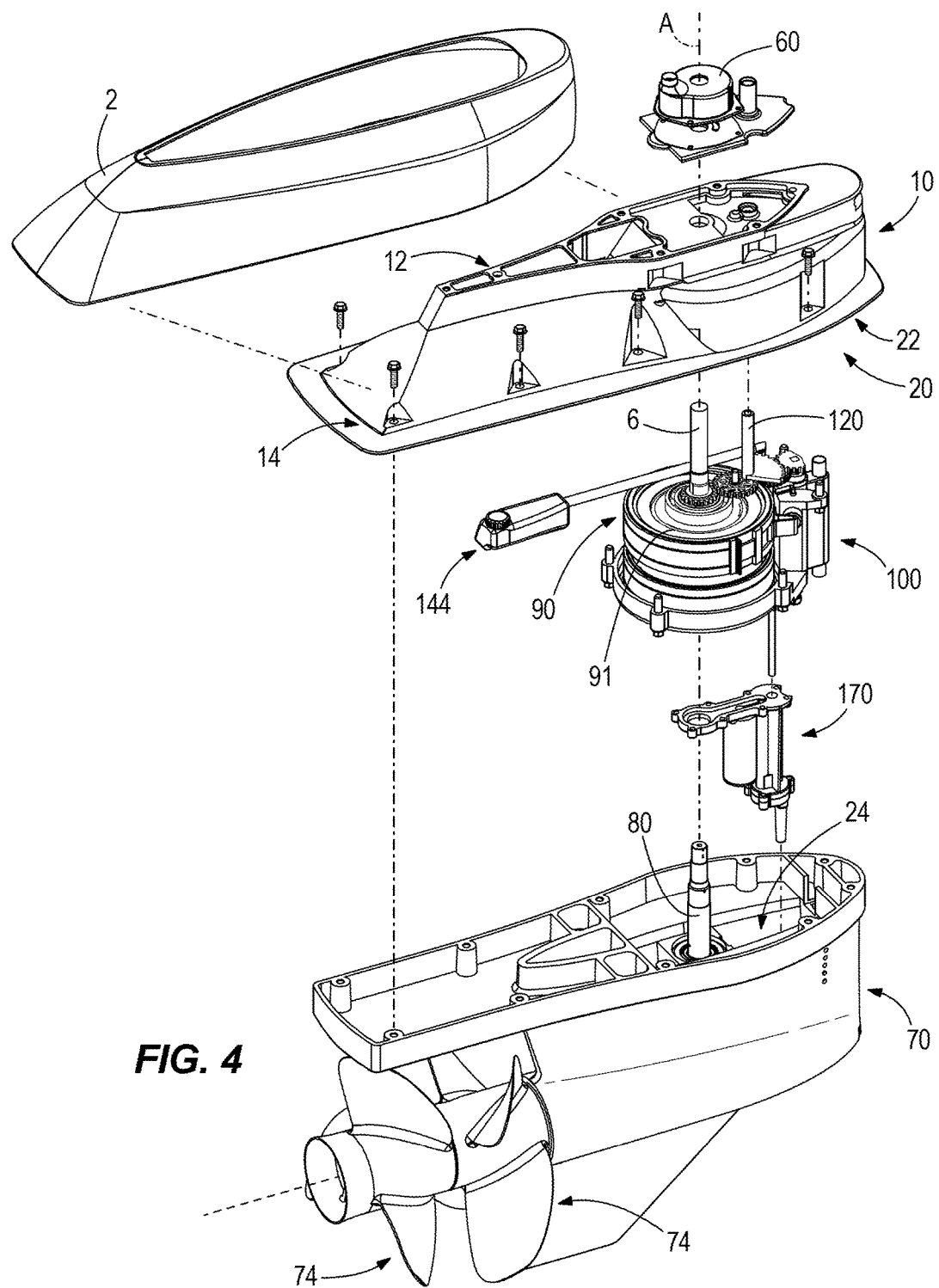
FIG. 4 is an exploded isometric view of the aft starboard side of the propulsion device.

FIG. 4 is an aft starboard view of the propulsion device 1 with the upper cowling 2 and the transmission housing 10 removed from the lower gearcase 70. Removing the transmission housing 10 reveals the transmission 90, which is shown here as a planetary transmission 91, though other transmission and clutch devices may instead be used. When fully assembled, the transmission 90 is contained within a transmission cavity 20 within the transmission housing 10. In some embodiments, the transmission cavity 20 comprises an upper transmission cavity 22 within the transmission housing 10, as well as a lower transmission cavity 24 within the lower gearcase 70, which together contain the transmission 90 when the transmission housing 10 is coupled to the lower gearcase 70.

FIG. 4 also shows the transmission output shaft 80 previously shown in FIG. 2, wherein the transmission 90 operably engages with the transmission output shaft 80 to provide rotational engagement between the driveshaft 6 and the propulsor shaft 72 that is located within the lower gearcase 70 as previously shown in FIG. 2.

FIG. 4 further shows a transmission actuator 100 that is operatively connected to the shifter 120, as will be discussed further below. Likewise, FIG. 4 shows a lubricant system 170 that provides lubrication to the transmission 90, set of angle gears 76, and propulsor shaft 72, which will also be discussed in detail below.

Figure 5:
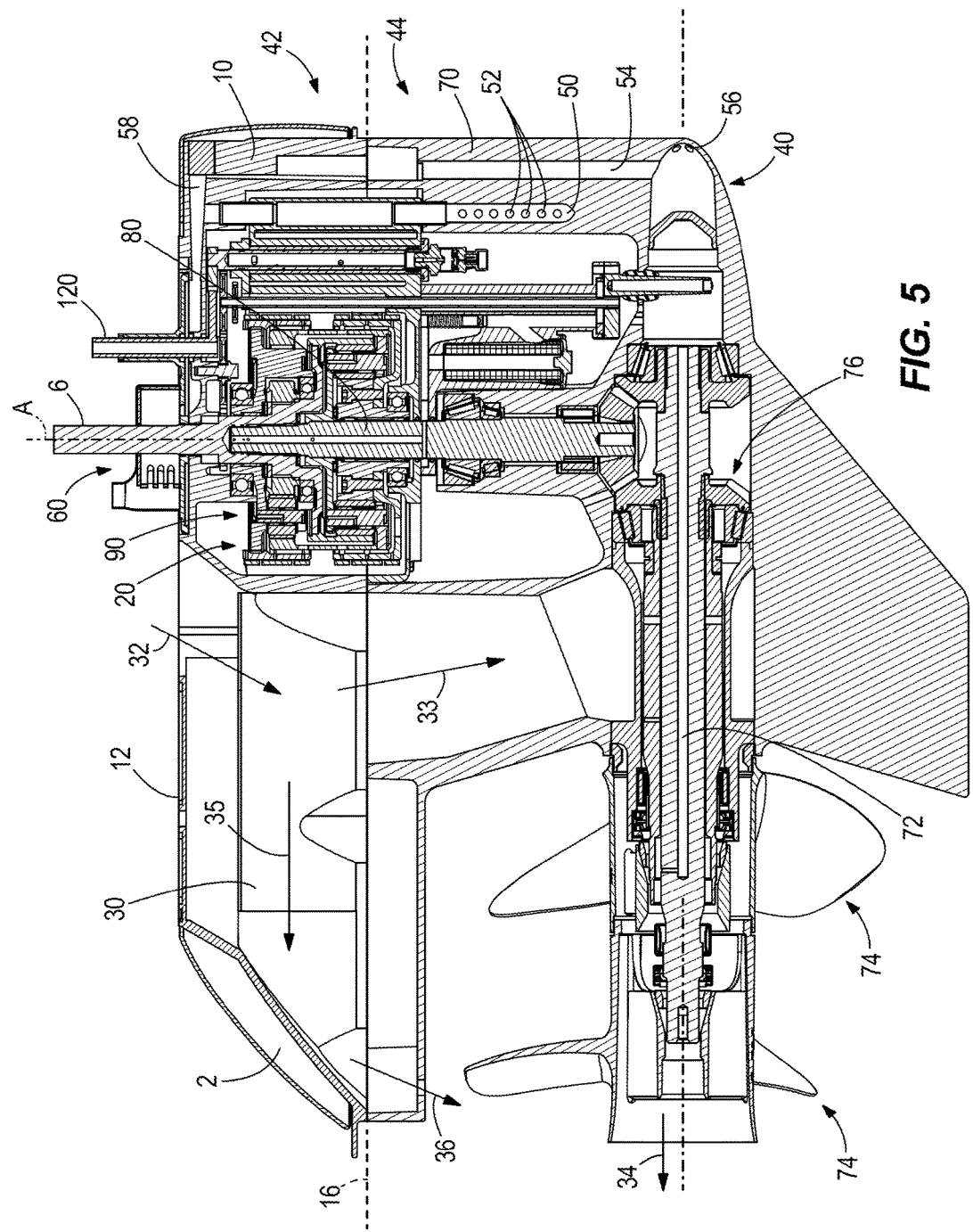
FIG. 5 is a partial section view taken along line 5-5 of FIG. 2.

FIG. 5 shows a sectional view taken from the starboard side of the lower portion of the propulsion device 1. The upper cowling 2 is shown covering the transmission housing 10 and the lower gearcase 70 is shown coupled to the transmission housing 10. A dotted line represents the split line 16 formed where the lower flange 14 of the transmission housing 10 (previously shown in FIG. 4) is coupled to an upper surface of the lower gearcase 70.

The transmission 90 is shown contained within the transmission cavity 20, whereby the transmission 90 operatively connects the driveshaft 6 and transmission output shaft 80, which engages through the set of angled gears 76 to cause rotation of the propulsor shaft 72 to create a propulsive force in a body of water through the propulsor 74. In the embodiment shown, the propulsion device 1 incorporates two counter-rotating propulsors with each propulsor 74 coupled to its own propulsor shaft and driven by a separate angled gear within the set of angled gears that engage the transmission output shaft 80, as is known within the art of dual counter-rotating propulsors. However, it should be known that the presently disclosed propulsion device is equally applicable to other configurations of dual propulsor or single propulsor devices.

The present inventors have found that incorporating the disclosed transmission housing 10 between the driveshaft housing 4 and the lower gearcase 70 is particularly advantageous for use with propulsion devices having a transmission. In typical propulsion devices known in the art that have transmissions, the transmission is located in either the lower gearcase or the driveshaft housing. However, the typical outboard motor does not have a transmission, but a clutching system. Using the presently disclosed transmission housing 10, a transmission 90 may be incorporated into the design of a typical outboard motor with no, or relatively little, impact to the driveshaft housing 4. Specifically, the disclosed transmission housing 10 may be coupled to a typical driveshaft housing 4, and the disclosed lower gearcase 70 coupled to the transmission housing 10, to incorporate a transmission into a typical outboard motor design. This provides flexibility for manufacturers across multiple product lines, modularity for component upgrades, and the ability to retrofit existing propulsion devices.

The present inventors have also found that the disclosed transmission housing 10 provides opportunities to communicate gas, fluids, and forces to, from, and between the driveshaft housing 4 and lower gearcase 70. The space available within the transmission housing 10 also provides the opportunity to tune certain attributes such as exhaust tone and back pressure.

As shown in FIG. 5, exhaust from the internal combustion engine 3 is diverted along path 32 through the upper cowling 2 and transmission housing 10 into the exhaust chamber 30. In one embodiment, this exhaust is then further diverted through path 33 in lower gearcase 70 to be exhausted via primary exhaust outlet 34 through the hub of propulsor 74. Alternatively, or in addition to being discharged through primary exhaust outlet 34, a portion of the exhaust may be discharged between propulsors or forward of a propulsor 74. In addition to the exhaust gas from path 32 being diverted along path 33 through the lower gearcase 70, the present disclosure also shows at least a portion of the exhaust gas being diverted along path 35 within the transmission housing 10, which may be ultimately discharged through a secondary exhaust outlet 36. In the embodiment shown, the secondary exhaust outlet 36 communicates exhaust from the transmission housing 10 through the lower gearcase 70 to be exhausted out the underside of lower gearcase 70, substantially above the propulsor 74. However, other locations for the secondary exhaust outlet 36 to discharge are anticipated by the present disclosure.

FIG. 5 further shows a cooling water circuit 40 that provides cooling water from a body of water that the propulsion device 1 operates in to cool the transmission actuator 100, in addition to cooling the internal combustion engine 3. The cooling water circuit 40 comprises an upper cooling passage 42 within the transmission housing 10 that is in fluid communication with a lower cooling passage 44 in the lower gearcase 70. In the embodiment shown, the lower cooling passage 44 further comprises a first cooling passage 50 and a second cooling passage 54 that each vertically extend within the lower gearcase 70. The first cooling passage 50 comprises a plurality of first inlet openings 52 in the port and starboard sides of the lower gearcase 70 that allow water from the body of water to enter into the first cooling passage 50. The second cooling passage 54 comprises a plurality of second inlet openings 56 that are located substantially near the forward side of the lower gearcase 70 to allow water to enter the second cooling passage 54.

In the embodiment shown, the first cooling passage 50 and the second cooling passage 54 remain substantially independent with regard to the water communicated therein until the first cooling passage 50 and the second cooling passage 54 meet with a third cooling passage 58. The third cooling passage 58 is shown within the transmission housing 10; however, it should be recognized that it could be positioned elsewhere, including the lower gearcase 70 or the driveshaft housing 4. A pump 60 is rotationally coupled to the driveshaft 6 to operate the pump 60. The pump 60 is fluidly coupled to the third cooling passage 58 to provide suction to draw water from the body of water through the third cooling passage 58 via the first cooling passage 50 and the second cooling passage 54. In this configuration, a blockage within the plurality of first inlet openings 52 or the plurality of second inlet openings 56, or within the first cooling passage 50 or second cooling passage 54 more generally, does not prevent water from flowing to the third cooling passage 58 through the unobstructed cooling passage, maintaining function of the cooling water circuit 40 to provide necessary cooling water.

Figure 6:
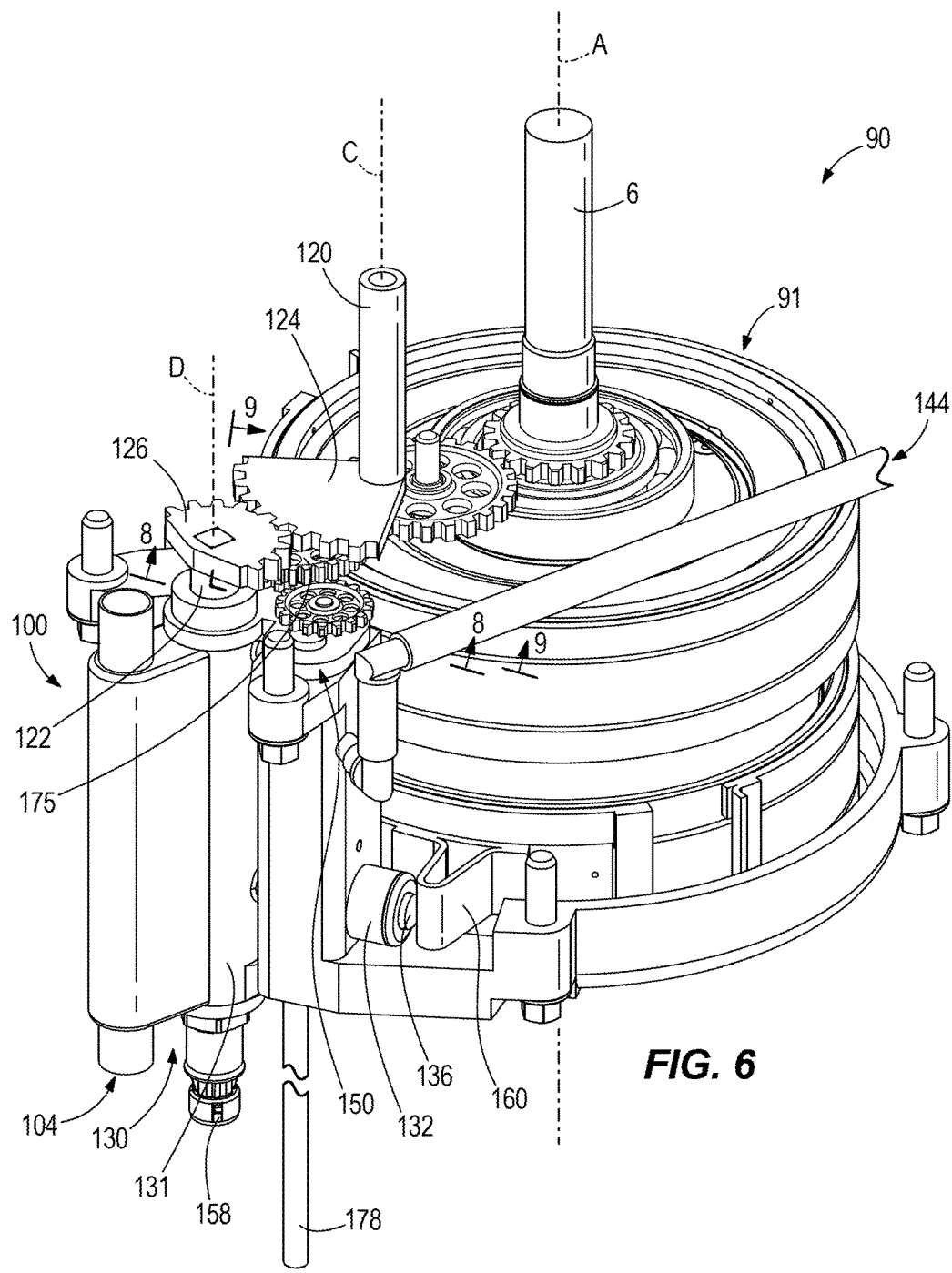
FIG. 6 is an isometric close-up view of one embodiment having a transmission actuator and transmission for the propulsion device.

FIG. 6 shows a close-up of the transmission 90 and the engagement with the shifter 120 and the transmission actuator 100. In the embodiment shown, the transmission 90 is a planetary transmission 91 that can be shifted between a forward gear, a neutral position, and a reverse gear through actuation and deactuation of corresponding band brakes 160. Specifically, the transmission 90 selectively engages the driveshaft 6 with the transmission output shaft 80 (shown in FIG. 5) in a forward gear in which forward rotation of the driveshaft 6 causes forward rotation of the transmission output shaft 80, in a neutral position in which rotation of the driveshaft 6 does not cause rotation of the transmission output shaft 80, and in a reverse gear in which forward rotation of the driveshaft 6 causes rotation in a reverse direction of the transmission output shaft 80. Although the present disclosure generally refers to the transmission 90 as having a forward gear, a neutral position, and a reverse gear, the present disclosure is equally applicable to transmission and clutch systems having differing quantities and configurations of gears. Similarly, while the present disclosure generally refers to the transmission 90 being a planetary transmission 91, the present disclosure is equally applicable to other types of transmissions. For example, the transmission 90 shown in FIG. 12 may be a multi-speed transmission known in the art.

The selection of a forward gear, a neutral position, and a reverse gear is made by actuating and deactuating the band brakes 160 corresponding to that gear. An actuator piston 132 causes the actuation and deactuation of each band brake 160 by selectively applying a force on the band brake 160 with an output finger 136. In the embodiment shown in FIG. 6, the transmission actuator 100 operates the actuation pistons 132 through use of a hydraulic actuator 130, for instance a spool valve 131 as will be discussed further below. In the context of a planetary transmission 91 as the transmission 90, the specific combination of activated and deactivated band brakes 160 determines the engagement and disengagement of the planetary gears within the planetary transmission housing 94 containing the planetary transmission 91, operably between the forward gear, neutral position, and reverse gear. Additional detail regarding activation and deactivation of band brakes to shift gears in a planetary transmission is provided in U.S. patent application Ser. No. 14/585,872 as previously introduced and incorporated by reference herein.

Figure 7:
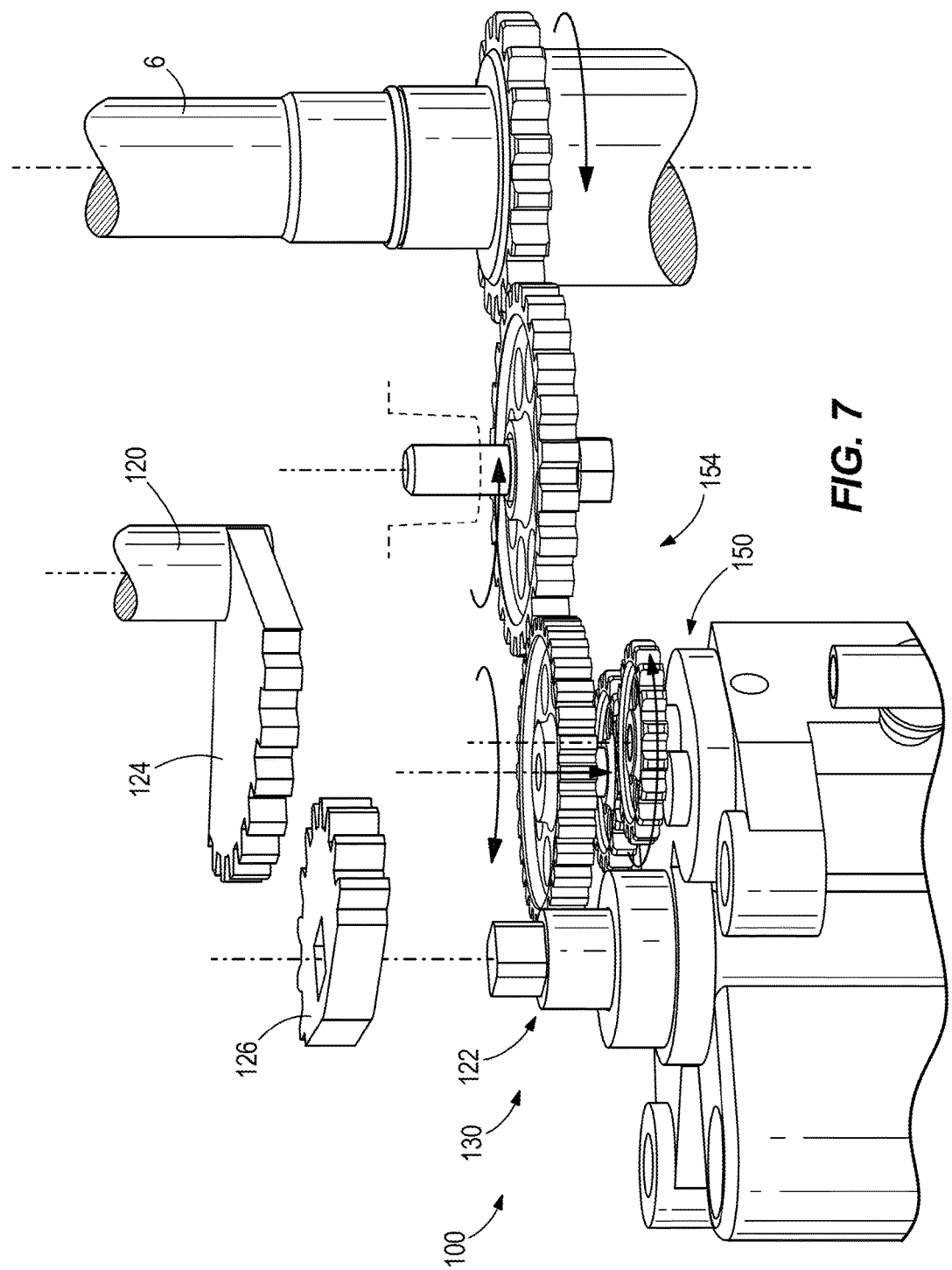
FIG. 7 is an exploded close-up view of a portion of the transmission actuator and transmission shown in FIG. 6.
Figure 8:
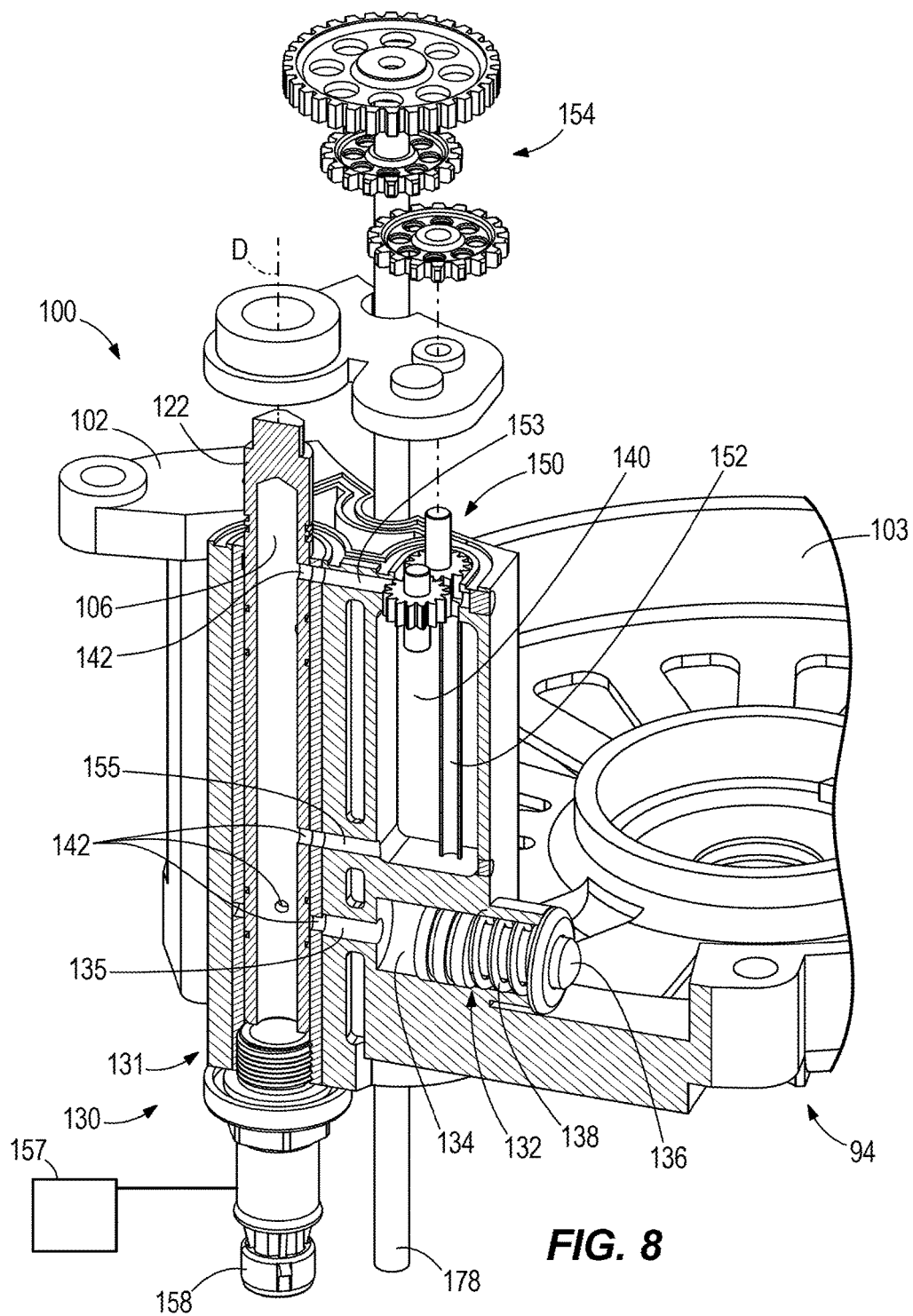
FIG. 8 is an exploded partial section view taken along line 8-8 in FIG. 6.

FIGS. 6-8 further shows the interaction between the shifter 120 and the transmission actuator 100, allowing a user of the propulsion device 1 to selectively engage the transmission in a forward gear, neutral position, or reverse gear. In the embodiment shown, rotation of the shifter 120 about the shifter axis C causes rotation of a first sector gear 124, which causes opposite rotation of a second sector gear 126. The second sector gear 126 is rotatably coupled to a valve actuator 122 that rotates about an actuator axis D. The valve actuator 122 selectively actuates the hydraulic actuator 130 to operate the actuation pistons 132.

It should be known that while the present embodiment operates by rotation of the valve actuator, other types of actuation are anticipated by this disclosure, such as a sliding valve actuator.

As shown in FIGS. 7 and 8, a pump 150 pumps the hydraulic fluid 108 within hydraulic actuator 130, as will also be described below. The gearset 154 rotatably couples the pump 150 to the driveshaft 6. Therefore, the pump 150 is configured to pump hydraulic fluid 108 anytime the internal combustion engine is running, regardless of whether the transmission 90 is in forward gear, neutral position, or reverse gear. Notwithstanding the previous statement, the embodiment shown in FIG. 8 also incorporates a pressure sensor 158 within the hydraulic actuator 130 that communicates with a controller 157 to stop increasing or to reduce the pressure created by the pump 150 if the hydraulic fluid 108 within the hydraulic actuator 130 exceeds a predetermined threshold. The controller 157 comprises a microprocessor and a memory that stores this predetermined threshold. The controller 157 communicates with the pressure sensor 158 to compare the pressure of the hydraulic fluid 108 to the predetermined threshold stored in the memory. When the pressure read by the pressure sensor 158 is determined to exceed the predetermined threshold, the controller 157 causes the hydraulic actuator 130 to direct a portion of the hydraulic fluid 108 back to the hydraulic fluid reservoir 140, thereby reducing or maintaining the pressure. In this regard, the hydraulic fluid 108 within the hydraulic actuator 130 may be regulated at a desired pressure despite the pump 150 continuously pumping by virtue of the pump 150 being rotatably coupled to the driveshaft 6. It should be known that the controller 157 may be located external to the hydraulic actuator 130 and pressure sensor 158.

In one embodiment, the controller 157 is configured to regulate the pressure of hydraulic fluid 108 within the hydraulic actuator 130 to provide controlled slippage between the driveshaft 6 and the transmission output shaft 80 to reduce the RPM of the transmission output shaft 80, as will be discussed below.

Although the hydraulic actuator 130 is configured to be a closed loop system that retains a consistent level of hydraulic fluid 108 therein, FIG. 3 shows inclusion of a replenishment port 144 for when there is a need to provide an additional volume of hydraulic fluid 108 within the transmission actuator 100. In the embodiment shown, the fill cap 145 is removed and additional hydraulic fluid 108 is poured into the replenishment port 144 to be fed by gravity into the hydraulic fluid reservoir 140. In some embodiments, a check valve is incorporated to prevent hydraulic fluid from exiting the hydraulic fluid reservoir 140 through the replenishment port 144.

FIG. 8 shows one embodiment of a hydraulic actuator 130, in this case a spool valve 131. The transmission 90 and band brake 160 have been removed for simplicity. The transmission actuator 100 comprises a housing 102 that contains the hydraulic actuator 130, the pump 150, a hydraulic fluid reservoir 140, a plurality of chambers 134, a cooling passage 104 (shown in FIG. 13), and an integral tray 103 to support the transmission 90. The hydraulic actuator 130 comprises a hydraulic core passage 106 that communicates hydraulic fluid 108 between the hydraulic fluid reservoir 140 and each chamber 134 containing an actuator piston 132. The pump 150 pumps the hydraulic fluid 108 up from the hydraulic fluid reservoir 140 through an input 152 and out to the hydraulic core passage 106 through an output opening 153. When the hydraulic actuator 130 is rotated such that one of the plurality of hydraulic passages 142 in the hydraulic core passage 106 is aligned with the output opening 153 of the pump 150, hydraulic fluid 108 is pumped from the hydraulic fluid reservoir 140 into the hydraulic core passage 106. When one of the plurality of hydraulic passages 142 is aligned to a drain opening 155 in the housing 102, hydraulic fluid 108 from the hydraulic core passage 106 returns to the hydraulic fluid reservoir 140.

Accordingly, the hydraulic actuator 130 operates the actuator pistons 132 by rotating along the actuator axis D to selectively communicate the hydraulic fluid 108 between the output opening 153 of the pump 150 and the input opening 135 of a chamber 134 to fluidly connect or disconnect the flow of hydraulic fluid 108 to the actuator piston 132 therein.

FIG. 8 shows an actuator piston 132 contained within a chamber 134 that selectively communicates with the hydraulic core passage 106 of the hydraulic actuator 130. In a relaxed state, a spring 138 causes the actuator piston 132 to remain in a retracted position such that the output finger 136 does not provide a force on the band brake 160. However, when the shifter 120 is rotated to align the plurality of hydraulic passages 142 in the hydraulic actuator 130 such that the hydraulic fluid 108 is pumped into the chamber 134, the pressure caused by the hydraulic fluid 108 forces the actuator piston 132 radially outwardly. This force causes the output finger 136 to impart a force on the band brake 160 to cause a shift in the transmission 90 between and amongst the forward gear, neutral position, and reverse gear.

As discussed above, in one embodiment the controller 157 regulates the pressure of the hydraulic fluid 108 within the hydraulic actuator 130 to provide controlled slippage between the driveshaft 6 and the transmission output shaft 80. Controlled slippage allows the vessel to operate at a reduced speed or in a trolling condition by causing the transmission output shaft 80 to rotate at a lower RPM than without slippage. In this example, the controller 157 regulates the pressure of the hydraulic fluid 108 within the hydraulic actuator 130 such that the actuator piston 132 imparts a reduced force on the band brake 160. The pressure regulation is configurable such that the force imparted by the actuator piston 132 on the band brake 160 is sufficient to shift the transmission 90 into one of the forward gear or the reverse gear, but such that some degree of controlled slippage occurs between the band brake 160 and the transmission 90. Specifically, the output finger 136 is positioned into an intermediate position by the reduced pressure of the hydraulic fluid 108 within the hydraulic actuator 130. The intermediate position of the output finger 136 is between the extended position and the retracted position and forces the band brake 160 into a partially-activated position that is between the activated position and deactivated position. By being only partially-activated, the band brake 160 does not fully engage with the transmission 90 and a controlled slippage occurs. The controlled slippage results in rotation of the transmission output shaft 80 at a reduced speed or lower RPM as compared to when no slippage occurs between the band brake 160 and the transmission 90.

Figure 9:
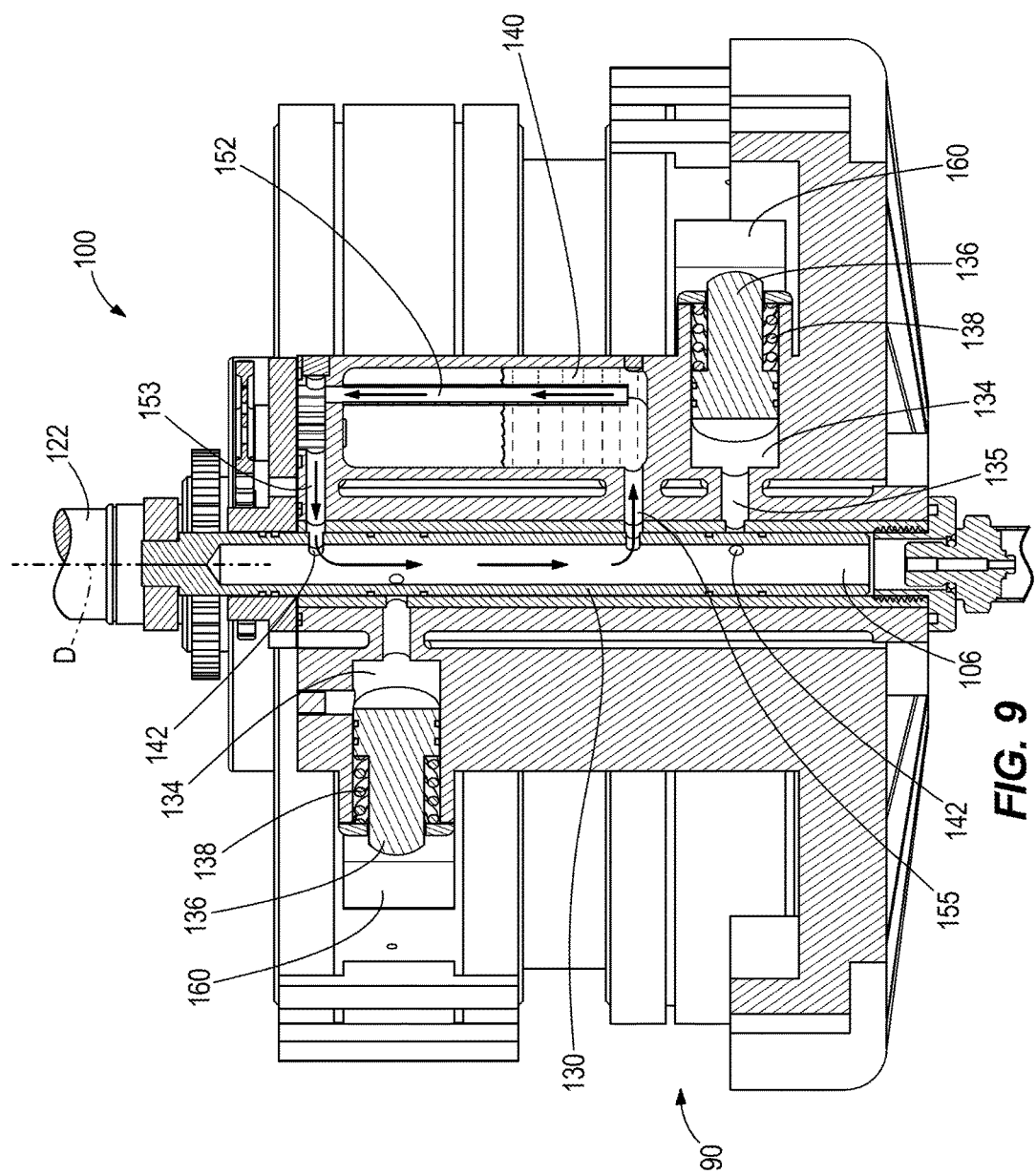
FIG. 9 is a partial section view taken along line 9-9 in FIG. 6.
Figure 10:
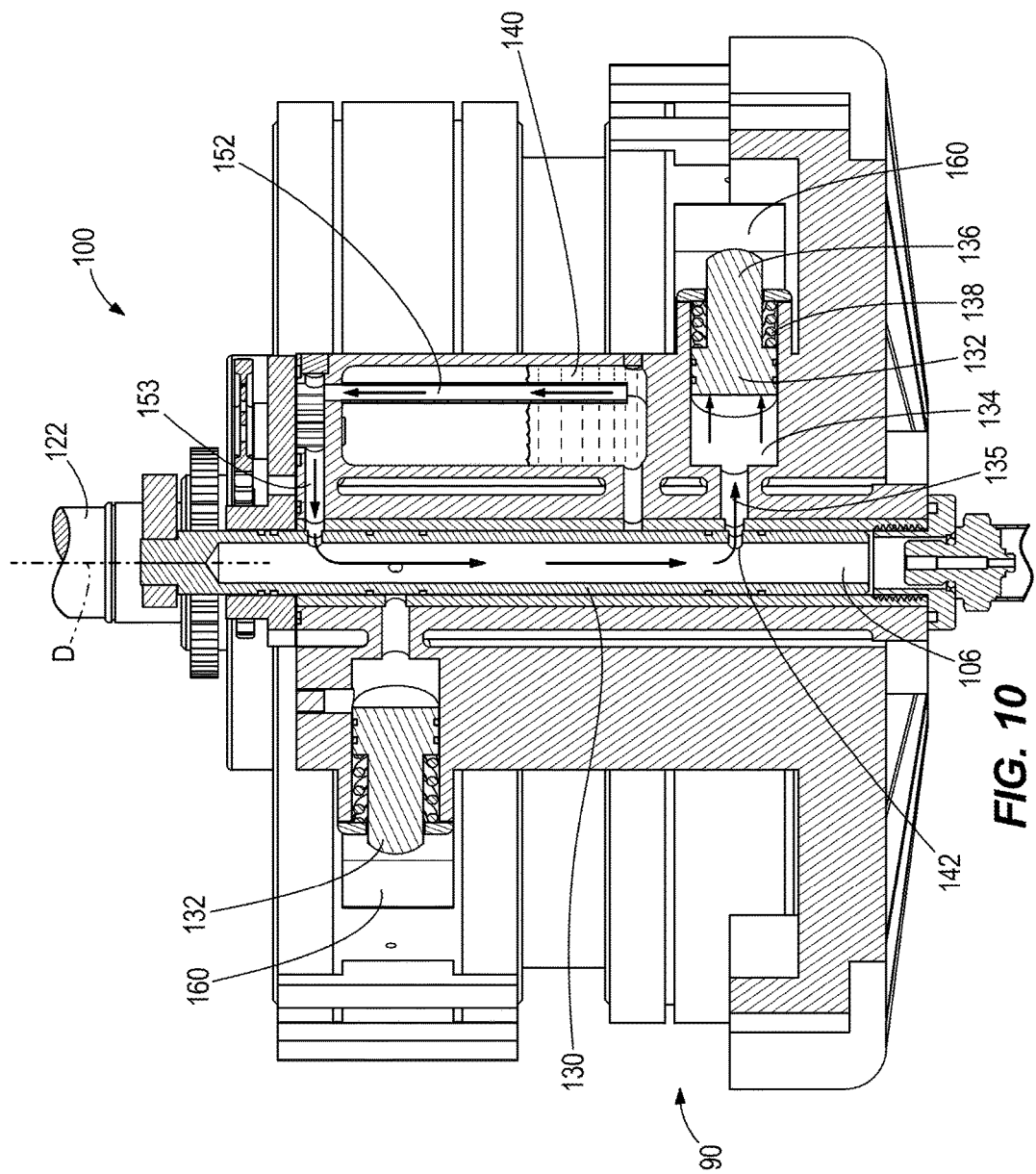
FIG. 10 is a partial section view like FIG. 9, demonstrating actuation of the transmission in one gear.
Figure 11:
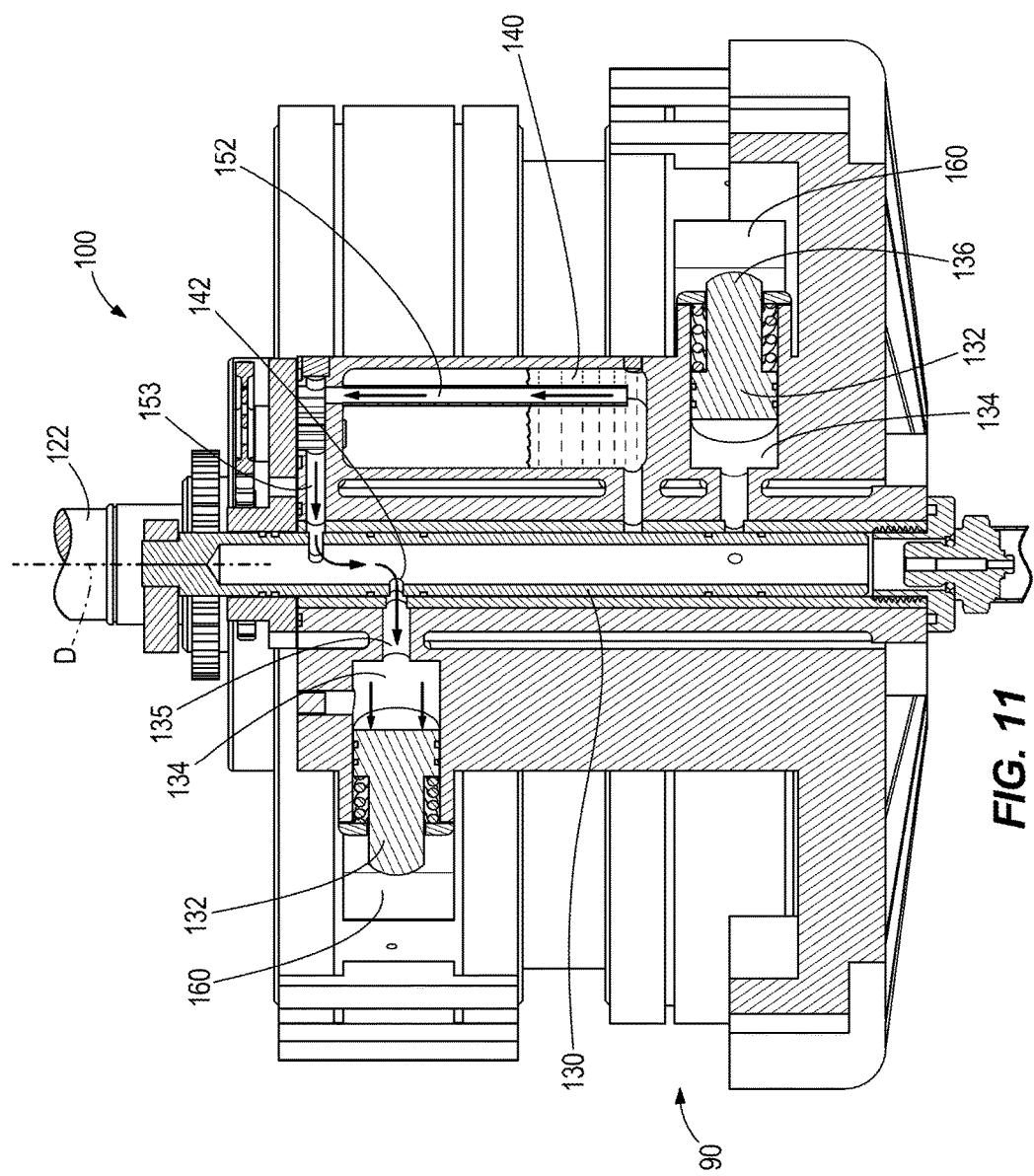
FIG. 11 is a partial section view like FIG. 9, demonstrating actuation of the transmission in another gear.

FIGS. 9-11 show the hydraulic actuator 130 rotated in various positions and the subsequent consequences. In particular, FIG. 9 shows the hydraulic actuator 130 rotated in an orientation such that the input opening 135 of the pump 150 communicates through the plurality of hydraulic passages 142 in the hydraulic core passage 106 with only the drain opening 155 leading back to the hydraulic fluid reservoir 140. Since none of the input openings 135 of the chambers 134 containing actuator pistons 132 are aligned to any of the plurality of hydraulic passages 142, no actuator pistons 132 are forced by the hydraulic fluid 108 to engage with their corresponding band brake 160. Depending on the particular configuration of the transmission, this may indicate that the shifter has rotated the valve actuator 122 to place the transmission in neutral position. However, this configuration could also shift the transmission into a forward gear or a reverse gear depending on the arrangement of gears within the transmission.

FIG. 10 shows the hydraulic actuator 130 rotated in a different position from that shown in FIG. 9, whereby the plurality of hydraulic passages 142 now fluidly connect the output opening 153 of pump 150 to the input opening 135 of the chamber 134 shown near the bottom to force engagement between the output finger 136 of the actuator piston 132 and the corresponding band brake 160. In contrast, the actuator piston 132 in the chamber 134 shown near the top of FIG. 10 remains disengaged with the corresponding band brake 160. Specifically, the input opening 135 corresponding to the actuator piston 132 shown near the top is not aligned with the plurality of hydraulic passages 142 in the hydraulic core passage 106. The configuration shown corresponds to the transmission 90 being engaged in a different gear than the configuration shown in FIG. 9. However, the particular gear of engagement once again depend upon the particular arrangement within the transmission 90.

Similarly, FIG. 11 discloses the hydraulic actuator 130 being rotated in a third position distinguishable from that shown in FIGS. 9 and 10. In this configuration, the plurality of hydraulic passages 142 within the hydraulic core passage 106 provide fluid communication only between the output opening 153 and the pump 150 and the chamber 134 corresponding to the actuator piston 132 near the top of the figure. Accordingly, this actuator piston 132 is engaged with the corresponding band brake 160, but there is no engagement between the actuator piston 132 shown near the bottom of the figure and its corresponding band brake 160. Therefore, the configurations shown in FIGS. 9, 10, and 11 may correspond to the different selections of forward gear, neutral position, and reverse gear in transmission 90 based on the particular arrangement of gears within the transmission 90 and the engagement of the band brakes 160.

The present inventors have found that the disclosed embodiments of hydraulic actuators are advantageous over the actuators known in the art by providing greater actuation forces while being packaged in a compact, self-contained system.

Figure 12:
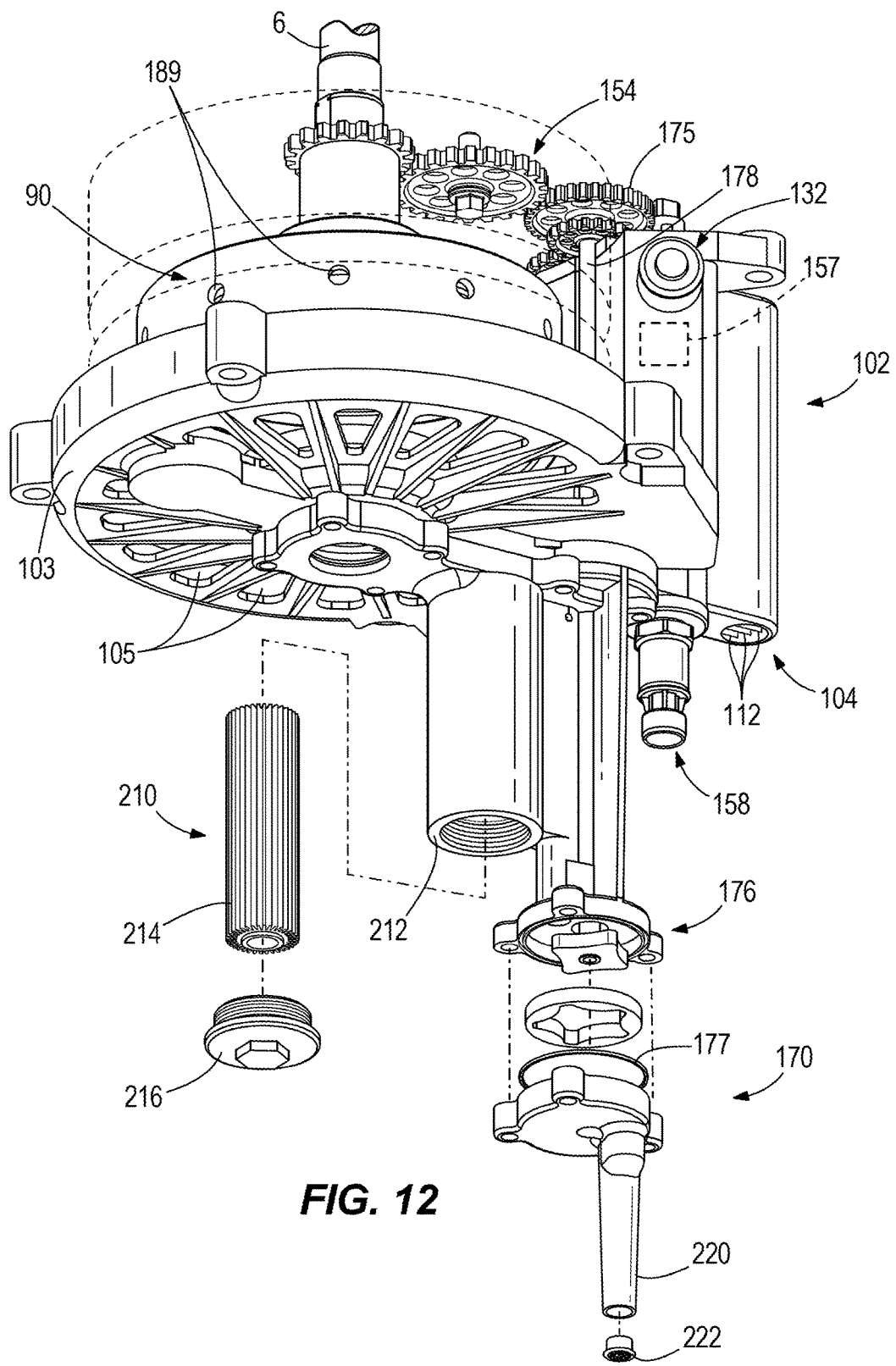
FIG. 12 is an isometric view of the lower side of the transmission and transmission actuator shown in FIG. 6.
Figure 13:
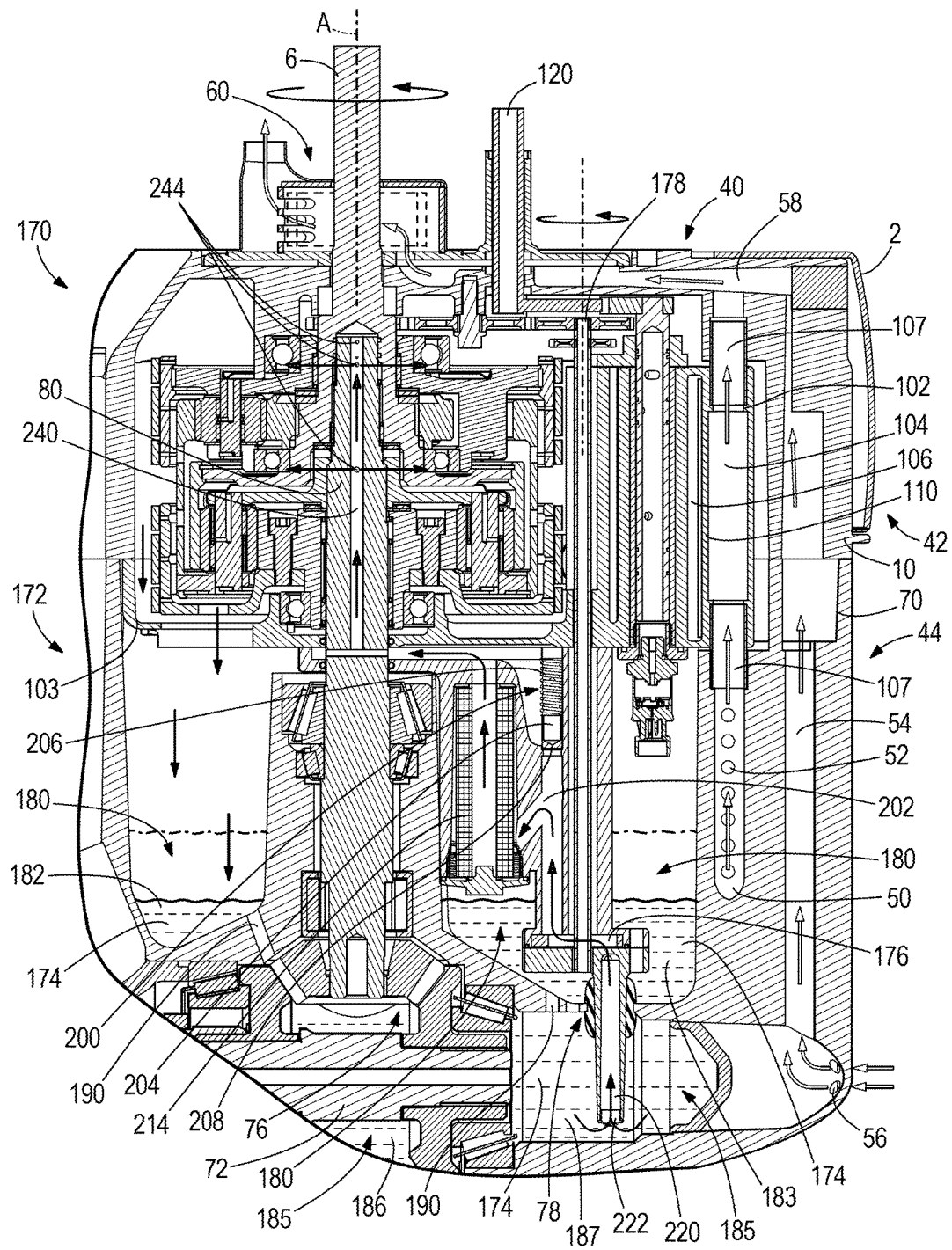
FIG. 13 is a close-up view of the propulsion device shown in FIG. 5 demonstrating the flow path of a lubricant through a lubricant circuit.

Returning to FIG. 6, the transmission actuator 100 disclosed further comprises a cooling passage 104, which is integrated with the cooling water circuit 40 that is pumped by pump 60 as previously discussed. Specifically, FIG. 13 shows an embodiment whereby the first cooling passage 50 is extended through the cooling passage 104 in the housing 102 of the transmission actuator 100 to provide cooling to the transmission actuator 100 and the hydraulic fluid 108 therein. This provides a compact, integrated design serving multiple functions. The first cooling passage 50 may be coupled by coupler 107 to join the cooling passage 104 in the housing 102, wherein the cooling passage 104 extends adjacent to the hydraulic core passage 106, separated by a common wall 110. By configuring the cooling water that enters the first cooling passage 50 through the first inlet openings 52 to pass through the cooling passage 104, heat is exchanged between the hydraulic fluid 108 within the hydraulic core passage 106 and the cooling water within the cooling passage 104 before being merged with the cooling water from second cooling passage 54 to combine within the third cooling passage 58 to proceed on to cool the internal combustion engine 3. The level of heat exchanged is controllable based on the thickness and material of the common wall 110, along with the length in which the cooling passage 104 and hydraulic core passage 106 are adjacently aligned. In the embodiment shown in FIG. 12, a plurality of ribs 112 extend from the common wall 110 into the cooling passage 104 to increase the surface area of material to facilitate additional heat exchange.

It should be noted that while FIG. 13 shows the first cooling passage 50 providing cooling water to the cooling passage 104 instead of the second cooling passage 54 providing cooling water to the cooling passage 104, these passages could be reversed, or combined such that all cooling water passes through the housing 102 of the transmission actuator 100 to provide heat transfer with the hydraulic fluid 108 therein.

The present inventors have found that the disclosed cooling water circuit 40 is particularly effective and efficient at cooling the internal combustion engine 3, the transmission actuator 100, and the fluids therein. By coupling the pump 60 to the driveshaft 6, the flow of cooling water through the cooling water circuit 40 increases with the internal combustion engine 3's RPM, thus coinciding with the increase in temperature at higher RPMs to provide a corresponding increase in cooling.

As previously discussed, the present disclosure further includes a lubricant system 170 that operatively engages with the driveshaft 6 through the gearset 154. As shown in FIGS. 12 and 13, rotation of the gearset 154 by the driveshaft 6 causes rotation of the pump driveshaft 178 through gear 175 to drive the pump 176 to circulate a lubricant 174 through a lubricant circuit to cool the transmission 90, set of angle gears 76, and propulsor shaft 72. As shown in FIG. 12, the lubricant system 170 pumps the lubricant 174 up through a screen 222 in an input 220, which is fluidly coupled to the pump 176 with a seal 177. In the embodiment shown, the pump 176 is a gerotor. In one pathway, the lubricant 174 from pump 176 passes through a filter 210 before lubricating the transmission 90. In the embodiment shown, the filter 210 comprises a filter housing 212 that contains a filter media 214 that is removably held in position by a removable cap 216. Additional detail regarding filtration of the lubricant and alternate pathways are discussed below.

After the lubricant 174 lubricates the transmission 90, which will also be described in further detail below, the lubricant 174 exits the transmission 90 through drains 189, the drains by gravity through openings 105 in the integral tray 103 of the housing 102 that supports the transmission 90. This lubricant 174 drained from transmission 90 then returns to a lower position where the pump 176 is once again pumped the lubricant 174 through the lubricant circuit 172.

FIG. 13 shows a partial section view of the lubricant system 170 in operation. The lubricant 174 is drawn up through the screen 222 in the input 220 and pumped by the pump 176 to a junction 202 in the lubricant circuit 172. Under normal circumstances, the lubricant 174 at the junction 202 is directed to flow through the filter media 214 before proceeding through the remainder of the lubricant circuit 172. However, if the pressure of the lubricant 174 within the junction 202 exceeds a predetermined threshold, such as would be caused by having clogged filter media 214, the lubricant 174 flows through the bypass valve 200. The flow through the bypass valve 200 may be instead of, or in addition to, continuing to flow through the filter media 214.

In the embodiment shown, the bypass valve 200 comprises a plug 204 that is normally biased by spring 206 such that the plug 204 creates a seal with the seat 208 to prevent flow of the lubricant 174 through the bypass valve 200. However, as previously described, when the pressure of the lubricant 174 at the junction 202 exceeds a predetermined value, the pressure of the lubricant 174 exceeds the opposing bias created by the spring 206 to permit at least a portion of the lubricant 174 to flow through the bypass valve 200 instead of through the filter media 214.

The present inventors have found that this embodiment provides an easily replaceable filter to keep the lubrication clean while providing a fail-safe to avoid a risk of an occluded lubricant flow if the filter media ceases to pass lubricant through it.

Whether the lubricant 174 proceeds through the filter media 214, the bypass valve 200, or both, the lubricant 174 continues to be pumped up through a passage 240 within the transmission output shaft 80. The lubricant 174 then exits the passage 240 through a plurality of radially extending passages 244 located along the transmission output shaft 80 at positions that specifically require, or best distribute, the lubricant within the transmission 90. As previously stated, after lubricating the transmission 90, the lubricant 174 drains by gravity through drains 189 (shown in FIG. 12), then through openings 105 in the integral tray 103 to a lower position.

The lubricant 174 that drains from the openings 105 in the integral tray 103 is contained within an upper lubricant cavity 180 and then the lower lubricant cavity 185. The lower lubricant cavity 185 substantially surrounds the propulsor shaft 72 and set of angle gears 76 such that they are also lubricated by the lubricant 174 within the lower lubricant cavity 185. Lubricant 174 from the upper lubricant cavity 180 drains by gravity to the lower lubricant cavity 185 through either metered holes 190 or a passage 192 (shown in FIG. 15) within the lower gearcase 70. In either configuration, the input 220 of pump 176 extends through an opening 78 in the lower gearcase 70 to be positioned within the lower lubricant cavity 185.

Figure 14:
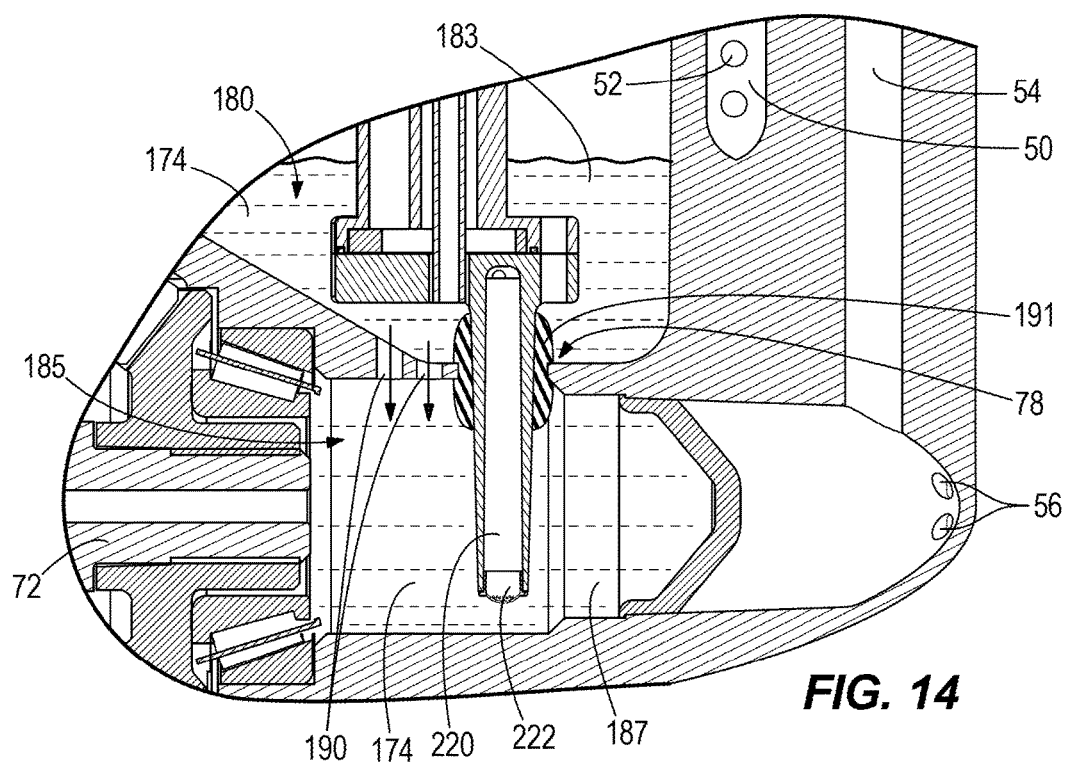
FIG. 14 is a close-up view like FIG. 13 showing a first embodiment of a return path for the lubricant circulating through the lubricant circuit.
Figure 15:
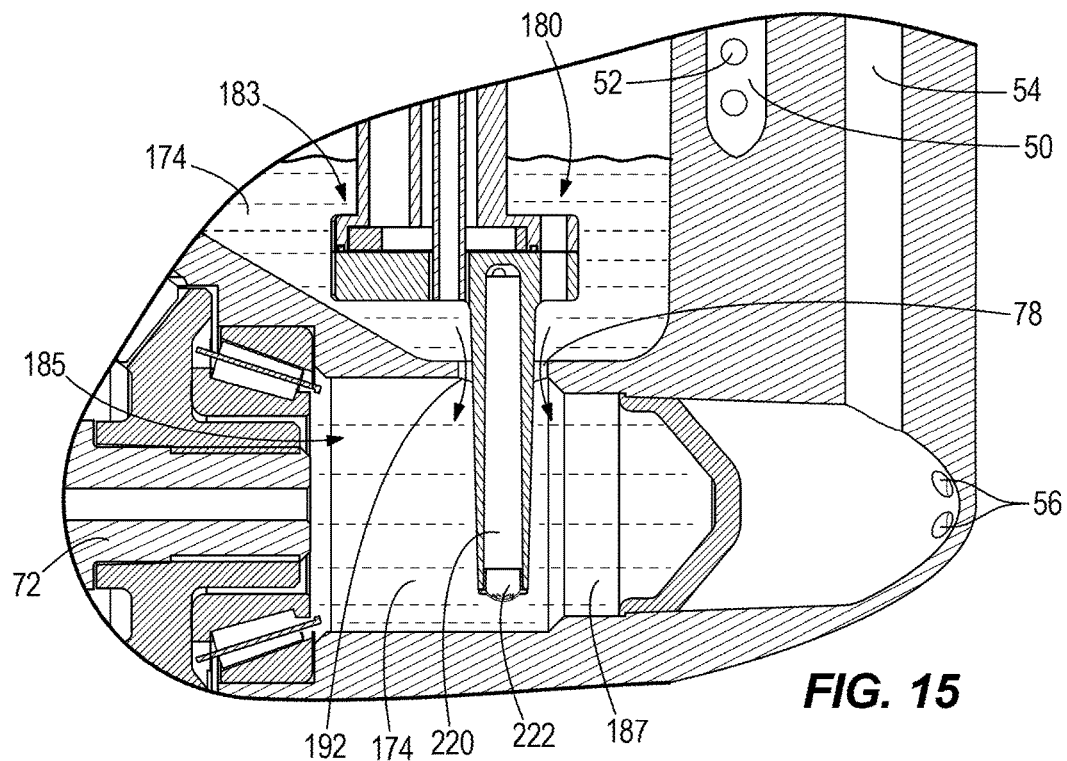
FIG. 15 is a close-up view like FIG. 13 showing an alternative embodiment for a return path of the lubricant circulating through the lubricant circuit.

In an embodiment having metered holes 190, as shown in FIG. 14, a gasket 191 prevents the flow of lubricant 174 from draining through the opening 78 in the lower gearcase 70 between the upper lubricant cavity 180 and the lower lubricant cavity 185. Instead, this draining occurs exclusively through the metered holes 190. In contrast, in the configuration in which a passage 192 is used instead of metered holes 190, no gasket is used so that the opening 78 in the lower gearcase 70 is oversized relative to the input 220 of pump 176 extending through the opening 87, which permits a metered volume of lubricant 174 to drain from the upper lubricant cavity 180 to the lower lubricant cavity 185 around the input 220. This embodiment, shown in FIG. 15, provides a potential savings in production as metered holes do not need to be drilled and the opening 78 becomes multi-purpose.

By using either metered holes 190 or a passage 192, the level of lubricant 174 within the lower lubricant cavity 185 surrounding the propulsor shaft 72 and set of angle gears 76 may be selected and optimized. Specifically, the level of lubricant 174 may be chosen to provide sufficient lubrication while also avoiding the excess drag and parasitic loss of power caused by surrounding the propulsor shaft 72 and set of angle gears 76 with excess amounts of lubricant 174. This optimization is accomplished by selecting the quantity and diameter of the metered holes or the size of the passage 192, in relation to the lubricant 174, to provide the proper metering effect.

The volume of lubricant 174 may also be optimized for different regions of the propulsion device to be lubricated. In the embodiment shown in FIG. 13, the upper lubricant cavity 180 further comprises a first lubricant cavity 182 and a second lubricant cavity 183. Likewise, the lower lubricant cavity 185 further comprises a third lubricant cavity 186 and a fourth lubricant cavity 187. By further dividing the upper lubricant cavity 180 and the lower lubricant cavity 185, the metered holes 190 may be configured such that the first lubricant cavity 182 drains into the third lubricant cavity 186, and the second lubricant cavity 183 drains into the fourth lubricant cavity 187. This permits additional optimization of the level of lubricant 174 surrounding different portions of the propulsor shaft 72 and set of angle gears 76, as well as the level of lubricant 174 within the vicinity of the input 220 of the pump 176.

The present inventors have found that the disclosed lubricant system is particularly advantageous with gearcases the require pressurized lubrication to ensure adequate flow at the proper location. Moreover, the gerotor disclosed provides a compact solution to direct lubricant to the required components, including a transmission located above the cavities containing the drained lubricant.

Accordingly, some embodiments of the present disclosure disclose an outboard motor 1 comprising: an internal combustion engine 3; a driveshaft 6 that is rotated by the internal combustion engine 3, wherein the driveshaft 6 is disposed in a driveshaft housing 4; a transmission 90 that is operatively connected to the driveshaft 6, wherein the transmission 90 is disposed in a transmission housing 10 located below the driveshaft housing 4; a set of angle gears 76 that operatively connect the transmission 90 to a propulsor 74 for imparting a propulsive force in a body of water, wherein the set of angle gears 76 are located in a lower gearcase 70 located below the transmission housing 10; and a lubrication system 170 that circulates lubricant 174 to and from the transmission 90. In one embodiment, the lubricant system 170 comprises a lubricant circuit 172 and a pump 176 that is configured to pump the lubricant 174 through the lubricant circuit 172. In one embodiment, the pump 176 is operatively connected to the driveshaft 6 so that rotation of the driveshaft 6 causes the pump 176 to pump the lubricant 174. In one embodiment, the outboard motor further comprises a gear 175 and a pump driveshaft 178 that operatively connect the driveshaft and the pump. In one embodiment, the lubricant circuit 172 comprises a lower lubricant cavity 185 and an upper lubricant cavity each within the lower gearcase 70, wherein the pump 176 circulates the lubricant 174 from the lower lubricant cavity 185 to the upper lubricant cavity 180. In one embodiment, the lubricant circuit 172 drains by gravity from the upper lubricant cavity 180 to the lower lubricant cavity 185. In one embodiment, the lubricant circuit 172 comprises a plurality of metered holes 190 in the upper lubricant cavity 180 through which the lubricant 174 drains by gravity from the upper lubricant cavity 180 to the lower lubricant cavity 185. In one embodiment, the upper lubricant cavity 180 comprises a first lubricant cavity 182 and a second lubricant cavity 183, wherein the lower lubricant cavity 185 comprises a third lubricant cavity 186 and a fourth lubricant cavity 187, and wherein the lubricant 174 drains from the first lubricant cavity 182 to the third lubricant cavity 186 and from the second lubricant cavity 183 to the fourth lubricant cavity 187. In one embodiment, the lubricant circuit 172 is configured to drain the lubricant 174 by gravity from the transmission 90 to the lower lubricant cavity 185. In one embodiment, the transmission 90 comprises a transmission output shaft 80 that operatively connects the driveshaft 6 and the propulsor 74, wherein the lubricant circuit 172 comprises a passage 240 through the transmission output shaft 80, wherein the pump 176 is configured to pump the lubricant 174 into the transmission 90 via the transmission output shaft 80. In one embodiment, the lower lubricant cavity 185 further comprises an opening 78 through which the transmission output shaft 80 extends, wherein the opening 78 constitutes at least one metered hole of the plurality of metered holes 190. In one embodiment, the lubricant circuit 172 comprises a plurality of radially extending passages 244 that are spaced apart along the transmission output shaft 80 and configured to disperse the lubricant 174 into the transmission 90. In one embodiment, the lubricant system 170 further comprises a filter 210 that is configured to filter the lubricant 174 as the lubricant 174 is circulated within the lubricant circuit 172. In one embodiment, the outboard motor further comprises a bypass valve 200 that opens to allow the lubricant 174 to bypass the filter 210, wherein the bypass valve 200 is normally closed and is configured to open when the lubricant 174 flowing into the filter 210 exceeds a predetermined pressure. In one embodiment, the bypass valve 200 comprises a plug 204 and a spring 206, wherein the spring 206 biases the plug 204 against a seat 208 to normally close the bypass valve 200. In one embodiment, the filter 210 comprises a filter housing 212, a filter media 214 disposed in the filter housing 212, and a removable cap 216 that allows for manual removal and replacement of the filter media 214.

The present disclosure further provides embodiments disclosing a lubrication distribution system for lubricating a drivetrain comprising: an internal combustion engine 3 and a driveshaft 6 that is rotated by the internal combustion engine 3; a transmission 90 and a transmission output shaft 80, wherein the transmission 90 operably connects the driveshaft 6 and the transmission output shaft 80; an upper lubricant cavity 180, a lower lubricant cavity 185, and a plurality of metered holes 190, wherein the upper lubricant cavity 180 is located higher than the lower lubricant cavity 185, and wherein the lubricant drains by gravity from the upper lubricant cavity to the lower lubricant cavity through the plurality of metered holes 190; and a pump 150 that pumps the lubricant 174 from the lower lubricant cavity 185 to the transmission 90 to lubricate the transmission 90, wherein the lubricant 174 drains from the transmission 90 to the upper lubricant cavity 180. In one embodiment, the lubrication distribution system further comprises a lower gearcase 70 that defines the plurality of metered holes 190 and the lower lubricant cavity 185. In one embodiment, the transmission output shaft 80 extends into the lower lubrication cavity 185 through an opening 78 that is one metered hole of the plurality of metered holes 190. In one embodiment, the pump 176 is operably connected to the driveshaft 6 such that rotation of the driveshaft 6 pumps the lubricant 174.

The present disclosure further discloses an outboard motor 1 comprising: an internal combustion engine 3 that causes rotation of a driveshaft 6; a planetary transmission 91 that operatively connects the driveshaft 6 to a transmission output shaft 80, wherein the planetary transmission 91 is operable in a forward gear in which forward rotation of the driveshaft 6 causes forward rotation of the transmission output shaft 80, a reverse gear in which forward rotation of the driveshaft 6 causes reverse rotation of the transmission output shaft 80, and a neutral position in which rotation of the driveshaft 6 does not cause rotation of the transmission output shaft 80; a band brake 160 configured to shift the planetary transmission 91 amongst the forward gear, neutral position, and reverse gear; and a transmission actuator 100 configured to actuate the band brake 160. In one embodiment, the transmission actuator 100 comprises an actuator piston 132 that is configured to activate the band brake 160, a pump 150 that pumps a hydraulic fluid 108, and a hydraulic actuator 130 that is positionable into and between a first position wherein the actuator piston 132 activates the band brake 160 and a second position wherein the actuator piston 132 deactivates the band brake 160. In one embodiment, activation of the band brake 160 causes the planetary transmission 91 to shift amongst the forward gear, neutral position, and reverse gear, and wherein deactivation of the band brake 160 causes the planetary transmission 91 to shift amongst the forward gear, neutral position, and reverse gear. In one embodiment, the actuator piston 132 comprises an output finger 136 that is positionable into and between an extended position in which the output finger 136 forces the band brake 160 into an activated position and a retracted position in which the output finger 136 allows the band brake 160 to move into a deactivated position. In one embodiment, the actuator piston 132 further comprises a spring 138 that biases the output finger 136 into the retracted position. In one embodiment, the output finger 136 is also positionable into and between an intermediate position in which the output finger 136 forces the band brake 160 into a partially-activated position, wherein the planetary transmission 91 causes the transmission output shaft 80 to rotate at an RPM, and wherein the RPM is lower when the band brake 160 is in the partially-activated position than when the band brake 160 is in the activated position. In one embodiment, the hydraulic actuator 130 comprises a spool valve 131 and a housing 102 that contains both the spool valve 131 and the actuator piston 132, wherein rotation of the spool valve 131 into the first position opens a flow of the hydraulic fluid 108 from the pump 150 to the actuator piston 132 and wherein opposite rotation of the spool valve 131 into the second position closes the flow of the hydraulic fluid 108 from the pump 150 to the actuator piston 132. In one embodiment, the housing 102 comprises an integral tray 103 that supports the planetary transmission 91. In one embodiment, the outboard motor further comprises a gearset 154 that connects the driveshaft 6 to the pump 150 such that rotation of the driveshaft 6 caucuses the pump 150 to pump the hydraulic fluid 108. In one embodiment, the outboard motor further comprises a controller 157 and a pressure sensor 158 that senses and communicates a pressure of the hydraulic fluid 108 in the hydraulic actuator 130 to the controller 157. In one embodiment, the outboard motor further comprises a valve actuator 122 that is operatively connected to the hydraulic actuator 130, wherein the valve actuator 122 comprises a second sector gear 126. In one embodiment, the hydraulic actuator 130 extends along an actuator axis D, the driveshaft 6 extends along a driveshaft axis A, and wherein the actuator axis D and driveshaft axis A are parallel. In one embodiment, the outboard motor further comprises a hydraulic fluid reservoir 140 and a replenishment port 144, whereby the pump 150 pumps the hydraulic fluid 108 from the hydraulic fluid reservoir 140, and wherein hydraulic fluid 108 may be added to the hydraulic fluid reservoir 140 via the replenishment port 144.

The present disclosure further provides embodiments disclosing a transmission actuator 100 for a propulsion device 1 having a planetary transmission 91 comprising: an internal combustion engine 3 that causes rotation of a driveshaft 6; a transmission output shaft 80; a planetary transmission 91 having a housing, wherein the planetary transmission 91 operatively connects the driveshaft 6 to the transmission output shaft 80 in a forward gear in which forward rotation of the driveshaft 6 causes the transmission output shaft 80 to rotate in a first direction, in a reverse gear in which forward rotation of the driveshaft 6 causes the transmission output shaft 80 to rotate in a second direction opposite of the first direction, and in a neutral position in which rotation of the driveshaft 6 does not cause the transmission output shaft 80 to rotate, and wherein the housing comprises a plurality of hydraulic passages 142 and a hydraulic fluid reservoir 140 that contains a hydraulic fluid 108; a band brake 160 configured to shift the planetary transmission 91 amongst the forward gear, the neutral position, and the reverse gear; and a hydraulic actuator 130 configured to actuate the band brake 160, the hydraulic actuator 130 comprising a plurality of openings 135, 153, 155 that are selectively alignable with the plurality of hydraulic passages 142 such that the hydraulic fluid 108 is communicated between the hydraulic fluid reservoir 140 and the hydraulic actuator 130. In one embodiment, the hydraulic actuator 130 further comprises a first position and a second position, wherein moving the hydraulic actuator 130 into the first position causes the planetary transmission 91 to shift into the forward gear, and wherein moving the hydraulic actuator 130 out of the first position causes the planetary transmission 91 to shift out of the forward gear. In one embodiment, the housing comprises a plurality of chambers 134 in fluid communication with the plurality of hydraulic passages, wherein the hydraulic fluid within a chamber of the plurality of chambers causes an actuation force to actuate the band brake. In one embodiment, the transmission actuator further comprises an actuator piston 132 and a spring 138 each located within each chamber 134, wherein the spring 138 causes a bias on the actuator piston 132, and wherein the actuation force from the hydraulic fluid 108 opposes the bias from the spring 138. In one embodiment, the transmission actuator further comprises a pump 150 that pumps the hydraulic fluid 108 from the hydraulic fluid reservoir 140 to the hydraulic actuator 130. In one embodiment, the pump 150 is located outside of the planetary transmission housing 94, and rotation of the driveshaft 6 causes operation of the pump 150. In one embodiment, the transmission actuator further comprises a controller 157 and a pressure sensor 158, wherein the pressure sensor 158 senses a pressure of the hydraulic fluid 108 and communicates the pressure with the controller 157, wherein the controller 157 prevents the pump 150 from pumping the hydraulic fluid 108 when the pressure is outside a predetermined range.

The present disclosure further discloses, an outboard motor 1 comprising: an upper cowling 2 that covers an internal combustion engine 3; a driveshaft housing 4 located below the upper cowling 2, wherein the driveshaft housing 4 covers a driveshaft 6 that is rotated by the internal combustion engine 3; a transmission housing 10 located below the driveshaft housing 4, wherein the transmission housing 10 covers a transmission 90 that is operably connected to the driveshaft 6; and a lower gearcase 70 located below the transmission housing 10, wherein the lower gearcase 70 covers a set of angle gears 76 that operably connect the transmission 90 to a propulsor 74 for imparting a propulsive force in a body of water. In one embodiment, the transmission 90 operably connects the driveshaft 6 to the set of angle gears 76 in forward gear, neutral position, and reverse gear. In one embodiment, the transmission housing 10 is coupled to and suspends from the driveshaft housing 4 and wherein the lower gearcase 70 is coupled to and suspends from the transmission housing 10. In one embodiment, the transmission housing 10 comprises an upper flange 12 that is bolted to the driveshaft housing 4 and a lower flange 14 that is bolted to the lower gearcase 70. In one embodiment, the transmission housing 10 is sandwiched between the driveshaft housing 4 and the lower gearcase 70. In one embodiment, the transmission 90 is contained within a transmission cavity 20 in the transmission housing 10 and wherein removal of the lower gearcase 70 from the transmission housing 10 provides manual access to the transmission 90. In one embodiment, the transmission housing 10 defines an exhaust chamber 30 configured to convey exhaust gas from the internal combustion engine 3 to atmosphere. In one embodiment, the lower gearcase 70 defines a primary exhaust outlet 34 and a secondary exhaust outlet 36 that each communicate with the exhaust chamber 30 in the transmission housing 10, wherein the secondary exhaust outlet 36 is closer than the primary exhaust outlet 34 to the transmission housing 10. In one embodiment, the exhaust chamber 30 is configured to meter portions of the exhaust conveyed to each of the primary exhaust outlet 34 and the secondary exhaust outlet 36. In one embodiment, the outboard motor further comprises a transmission actuator 100 disposed in the transmission housing 10, the transmission actuator 100 configured to shift the transmission 90 amongst the forward gear, neutral position, and reverse gear. In one embodiment, the transmission housing 10 defines a cooling water circuit 40 configured to convey cooling water past the transmission actuator 100. In one embodiment, the driveshaft 6 extends into the transmission housing 10 and is operably connected to the transmission 90 in the transmission housing 10, and wherein a transmission output shaft 80 extends out of the transmission housing 10 and is operably connected to the set of angle gears 76 in the lower gearcase 70. In one embodiment, the transmission housing 10 and lower gearcase 70 face each other at a split line 16 and wherein the transmission 90 extends across the split line 16 such that a first portion of the transmission 90 is located in the transmission housing 10 and a second portion of the transmission 90 is located in the lower gearcase 70. In one embodiment, the transmission 90 comprises a planetary transmission 91 that is partially disposed in the transmission housing 10 and partially disposed in the lower gearcase 70. In one embodiment, the driveshaft 6 vertically extends along a driveshaft axis A and wherein the set of angle gears 76 are connected to a propulsor shaft 72 that horizontally extends along a propulsor shaft axis B, wherein the driveshaft axis A is perpendicular to the propulsor shaft axis B. In one embodiment, the transmission 90 comprises a transmission output shaft 80 that extends parallel to the driveshaft axis A, wherein the transmission output shaft 80 comprises a vertically lower end that is operatively coupled to the propulsor shaft 72 by the set of angle gears 76.

The present disclosure further provides embodiments disclosing an outboard motor 1 comprising: an upper cowling 2, a driveshaft housing 4 located below the upper cowling 2, a transmission housing 10 located below the driveshaft housing 4, and a lower gearcase 70 located below the transmission housing 10; an internal combustion engine 3 that is covered by the upper cowling 2; a driveshaft 6 that is rotated by the internal combustion engine 3, wherein the driveshaft 6 extends into the driveshaft housing 4; a transmission 90 disposed in the transmission housing 10, the transmission 90 operably connected to the driveshaft 6 in at least forward gear and neutral position; and a set of angle gears 76 disposed in the lower gearcase 70, wherein the set of angle gears 76 are configured to operably connect the transmission 90 to a propulsor 74 configured to provide a propulsive force in a body of water.

The present disclosure further provides embodiments disclosing a propulsion device 1 comprising: an internal combustion engine 3 having a driveshaft 6, wherein the internal combustion engine 3 causes the driveshaft 6 to rotate; a driveshaft housing 4 that covers the driveshaft 6; a transmission housing 10 located below the driveshaft housing 4, wherein the transmission housing 10 covers a transmission output shaft 80 that is operably connected to the driveshaft 6; and a lower gearcase 70 located below the transmission housing 10, wherein the lower gearcase 70 covers a propulsor shaft 72 that is operably connected the transmission output shaft 80, wherein the propulsor shaft 72 is operably connected to a propulsor 74 for imparting a propulsive force in a body of water. In one embodiment, the transmission housing 10 is removeably coupled to the driveshaft housing 4 and the lower gearcase 70 is removeably coupled to the transmission housing 10. In one embodiment, the propulsion device 1 further comprises a multispeed transmission that operably connects the driveshaft 6 to the transmission output shaft 80, wherein the transmission housing 10 defines an upper transmission cavity 22, wherein the lower gearcase 70 defines a lower transmission cavity 24, and wherein the multispeed transmission is located within the upper transmission cavity 22 and the lower transmission cavity 24.

The present disclosure further discloses an outboard motor 1 comprising: an internal combustion engine 3 that causes rotation of a driveshaft 6; a planetary transmission 91 that operatively connects the driveshaft 6 to a transmission output shaft 80; a band brake 160 configured to shift the planetary transmission 91 amongst a forward gear, neutral position, and reverse gear; a hydraulic actuator 130 configured to actuate the band brake 160; a cooling water circuit 40 that extends adjacent to the hydraulic actuator 130 so that the hydraulic actuator 130 exchanges heat with cooling water in the cooling water circuit 40. In one embodiment, the outboard motor 1 comprises a driveshaft housing 4 that covers the driveshaft 6, a transmission housing 10 that is separate from the driveshaft housing 4 and located below the driveshaft housing 4, wherein the transmission housing 10 houses the planetary transmission 91, and a lower gearcase 70 that is separate from and located below the transmission housing 10, wherein the lower gearcase 70 covers a set of angle gears 76 that operably connect the transmission output shaft 80 to a propulsor 74 for imparting a propulsive force in a body of water. In one embodiment, the cooling water circuit 40 comprises a lower cooling passage 44 that extends through the lower gearcase 70, wherein the cooling water circuit 40 comprises an upper cooling passage 42 that extends through the transmission housing 10 adjacent to the hydraulic actuator 130, and further comprising a pump 60 that pumps cooling water from the lower cooling passage 44 to the upper cooling passage 42. In one embodiment, the outboard motor further comprises a first inlet opening 52 formed in the lower gearcase 70, wherein the cooling water enters the lower cooling passage 44 via the first inlet opening 52. In one embodiment, the lower cooling passage 44 comprises a first cooling passage 50 and a second cooling passage 54, further comprising a second inlet opening 56 formed in the lower gearcase 70, wherein the cooling water enters the first cooling passage 50 via the first inlet opening 52 and the cooling water enters the second cooling passage 54 via the second inlet opening 56. In one embodiment, the pump 60 is configured to cause cooling water to flow in parallel through the first cooling passage 50 and second cooling passage 54. In one embodiment, the first inlet opening 52 is located vertically higher on the lower gearcase 70 than the second inlet opening 56. In one embodiment, the first cooling passage 50 and the second cooling passage 54 merge to form a third cooling passage 58, the third cooling passage 58 receiving cooling water from the first cooling passage 50 and the second cooling passages 54. In one embodiment, the third cooling passage 58 is located within the transmission housing 10. In one embodiment, the pump 60 is located in the third cooling passage 58. In one embodiment, the hydraulic actuator 130 comprises a housing 102 and wherein the cooling water circuit 40 is located adjacent the housing 102. In one embodiment, the hydraulic actuator 130 comprises a spool valve 131 disposed in the housing 102, wherein the spool valve 131 is elongated parallel to a portion of the cooling water circuit 40 that is adjacent to the housing 102. In one embodiment, the housing 102 comprises a plurality of ribs 112 that extend into the portion of the cooling water circuit 40 that is adjacent to the housing 102. In one embodiment, the cooling water circuit 40 extends adjacent to the internal combustion engine 3 such that the internal combustion engine 3 exchanges heat with the cooling water in the cooling water circuit 40.

The present disclosure further provides embodiments disclosing a propulsion device 1 comprising: an internal combustion engine 3 and a driveshaft 6 that is caused to rotate by the internal combustion engine 3; a transmission 90 and a transmission output shaft 80, wherein the transmission 90 operatively connects the driveshaft 6 and the transmission output shaft 80; a shifter 120 configured to shift the transmission 90 between a plurality of gears; a hydraulic actuator 130 configured to actuate the shifter 120; and a cooling water circuit 40 configured to circulate a cooling water to cool the internal combustion engine 3, wherein the cooling water circuit 40 comprises a cooling passage 104 such that the hydraulic actuator 130 exchanges heat with the cooling water. In one embodiment, the hydraulic actuator 130 comprises a hydraulic core passage 106 configured to communicate a hydraulic fluid 108, further comprising a common wall 110 that separates the hydraulic core passage 106 from the cooling water circuit 40. In one embodiment, the common wall 110 comprises a plurality of ribs 112 that outwardly extend from the common wall 110. In one embodiment, the propulsion device 1 further comprises a transmission housing 10 that covers the transmission 90, a propulsor 74 that is operatively connected by a propulsor shaft 72 to the transmission outlet shaft 80 to impart a propulsive force, and a lower gearcase 70 that covers the propulsor shaft 72, wherein the cooling water circuit 40 extends within at least the transmission housing 10. In one embodiment, the cooling water circuit 40 comprises a lower cooling passage 44 that extends though the lower gearcase 70, wherein the cooling water circuit 40 comprises an upper cooling passage 42 that extends through the transmission housing 10, and further comprising a pump 60, wherein the pump 60 pumps the cooling water from the lower cooling passage 44 to the upper cooling passage 42.

The present disclosure further provides embodiments disclosing a hydraulic fluid cooling system configured to circulate a coolant for cooling an internal combustion engine 3 and also to cool a hydraulic fluid 108 in a transmission actuator 100 that actuates a transmission 90, the hydraulic fluid cooling system comprising a transmission housing 10 that defines a transmission cavity 20 configured to house the transmission 90 therein, wherein the transmission housing 10 defines a hydraulic core passage 106 that communicates the hydraulic fluid 108 to actuate the transmission 90, and wherein the transmission housing 10 defines a cooling passage 104 for communicating the coolant such that heat exchanges between the hydraulic fluid 108 in the hydraulic core passage 106 and the coolant in the cooling passage 104.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

What is claimed is:

1. An outboard motor comprising:
an internal combustion engine;
a driveshaft that is rotated by the internal combustion engine, wherein the driveshaft is disposed in a drive shaft housing;
a transmission that is operatively connected to the driveshaft, wherein the transmission is disposed in a transmission housing located below the driveshaft housing;
a set of angle gears that operatively connect the transmission to a propulsor for imparting a propulsive force in a body of water, wherein the set of angle gears are located in a lower gearcase located below the transmission housing; and a lubrication system that circulates lubricant to the transmission housing from the gearcase.

2. The outboard motor according to claim 1, wherein the lubricant system comprises a lubricant circuit and a pump that is configured to pump the lubricant through the lubricant circuit.

3. The outboard motor according to claim 2, wherein the pump is operatively connected to the driveshaft so that rotation of the driveshaft causes the pump to pump the lubricant.

4. The outboard motor according to claim 3, further comprising a gear and a pump shaft that operatively connect the driveshaft and the pump.

5. The outboard motor according to claim 2, wherein the lubricant circuit comprises a lower lubricant cavity and an upper lubricant cavity each within the lower gearcase, wherein the pump circulates the lubricant from the lower lubricant cavity to the upper lubricant cavity.

6. The outboard motor according to claim 5, wherein the lubricant circuit drains by gravity from the upper lubricant cavity to the lower lubricant cavity.

7. An outboard motor comprising:
an internal combustion engine;
a driveshaft that is rotated by the internal combustion engine, wherein the driveshaft is disposed in a driveshaft housing;
a transmission that is operatively connected to the driveshaft, wherein the transmission is disposed in a transmission housing located below the driveshaft housing;
a set of angle gears that operatively connect the transmission to a propulsor for imparting a propulsive force in a body of water, wherein the set of angle gears are located in a lower gearcase located below the transmission housing; and
a lubrication system that circulates lubricant to from the transmission housing from the gearcase;
wherein the lubricant system comprises a lubricant circuit and a pump that is configured to pump the lubricant through the lubricant circuit;
wherein the pump is operatively connected to the driveshaft so that rotation of the driveshaft causes the pump to pump the lubricant;
wherein the lubricant circuit comprises a lower lubricant cavity and an upper lubricant cavity each within the lower gearcase, wherein the pump circulates the lubricant from the lower lubricant cavity to the upper lubricant cavity;
wherein the lubricant circuit drains by gravity from the upper lubricant cavity to the lower lubricant cavity; and
wherein the lubricant circuit comprises a plurality of metered holes in the upper lubricant cavity through which the lubricant drains by gravity from the upper lubricant cavity to the lower lubricant cavity.

8. The outboard motor according to claim 7, wherein the upper lubricant cavity comprises a first lubricant cavity and a second lubricant cavity, wherein the lower lubricant cavity comprises a third cavity lubricant and a fourth lubricant cavity, and wherein the lubricant drains from the first lubricant cavity to the third lubricant cavity and from the second lubricant cavity to the fourth lubricant cavity.

9. The outboard motor according to claim 5, wherein the lubricant circuit is configured to drain the lubricant by gravity from the transmission to the lower lubricant cavity.

10. The outboard motor according to claim 8, wherein the transmission comprises a transmission output shaft that operatively connects the driveshaft and the propulsor, wherein the lubricant circuit comprises a passage through the transmission output shaft, wherein the pump is configured to pump the lubricant into the transmission via the transmission output shaft.

11. The outboard motor according to claim 10, wherein the lower lubricant cavity further comprises an opening through which the transmission output shaft extends, wherein the opening constitutes at least one metered hole of the plurality of metered holes.

12. The outboard motor according to claim 10, wherein the lubricant circuit comprises a plurality of radially extending passages that are spaced apart along the transmission output shaft and configured to disperse the lubricant into the transmission.

13. The outboard motor according to claim 2, wherein the lubricant system further comprises a filter that is configured to filter the lubricant as the lubricant is circulated within the lubricant circuit.

14. An outboard motor comprising:
an internal combustion engine;
a driveshaft that is rotated by the internal combustion engine, wherein the driveshaft is disposed in a drive shaft housing;
a transmission that is operatively connected to the driveshaft, wherein the transmission is disposed in a transmission housing located below the driveshaft housing;
a set of angle gears that operatively connect the transmission to a propulsor for imparting a propulsive force in a body of water, wherein the set of angle gears are located in a lower gearcase located below the transmission housing;
a lubrication system that circulates lubricant to from the transmission housing from the gearcase;
wherein the lubricant system comprises a lubricant circuit and a pump that is configured to pump the lubricant through the lubricant circuit;
wherein the lubricant system further comprises a filter that is configured to filter the lubricant as the lubricant is circulated within the lubricant circuit; and
a bypass valve that opens to allow the lubricant to bypass the filter, wherein the bypass valve is normally closed and is configured to open when the lubricant flowing into the filter exceeds a predetermined pressure.

15. The outboard motor according to claim 14, wherein the bypass valve comprises a plug and a spring, wherein the spring biases the plug against a seat to normally close the bypass valve.

16. The outboard motor according to claim 13, wherein the filter comprises a filter housing, a filter media disposed in the filter housing, and a removable cap that allows for manual removal and replacement of the filter media.

17. A lubrication distribution system for lubricating a drivetrain comprising:
an internal combustion engine and a driveshaft that is rotated by the internal combustion engine;
a transmission and a transmission output shaft, wherein the transmission operably connects the driveshaft and the transmission output shaft;
an upper lubricant cavity, a lower lubricant cavity, and a plurality of metered holes, wherein the upper lubricant cavity is located higher than the lower lubricant cavity, and wherein the lubricant drains by gravity from the upper lubricant cavity to the lower lubricant cavity through the plurality of metered holes; and
a pump that pumps the lubricant from the lower lubricant cavity to the transmission to lubricate the transmission, wherein the lubricant drains from the transmission to the upper lubricant cavity.

18. The lubrication distribution system according to claim 17, further comprising a lower gearcase that defines the plurality of metered holes and the lower lubricant cavity.

19. The lubrication distribution system according to claim 18, wherein the transmission output shaft extends into the lower lubrication cavity through an opening that is one metered hole of the plurality of metered holes.

20. The lubrication distribution system according to claim 16, wherein the pump is operably connected to the driveshaft such that rotation of the driveshaft pumps the lubricant.

* * * * *